(12) United States Patent
Fraser et al.

(10) Patent No.: US 11,673,816 B2
(45) Date of Patent: Jun. 13, 2023

(54) SYSTEMS AND METHODS FOR TREATING HARMFUL BIOLOGICAL CONTAMINANTS IN HVAC SYSTEMS

(71) Applicants: Desmond A. Fraser, Herndon, VA (US); Hossein Ghaffari Nik, Fairfax, VA (US); Richard B. McMurray, Fairfax, VA (US); Akrem Hassen Adem Aberra, Fairfax, VA (US); Shelley Marie Grandy, Ashburn, VA (US); Patrick J. Hughes, Vienna, VA (US); David Anthony Davis, Vienna, VA (US); Kyler Delman Sparks, Vienna, VA (US)

(72) Inventors: Desmond A. Fraser, Herndon, VA (US); Hossein Ghaffari Nik, Fairfax, VA (US); Richard B. McMurray, Fairfax, VA (US); Akrem Hassen Adem Aberra, Fairfax, VA (US); Shelley Marie Grandy, Ashburn, VA (US); Patrick J. Hughes, Vienna, VA (US); David Anthony Davis, Vienna, VA (US); Kyler Delman Sparks, Vienna, VA (US)

( * ) Notice: Subject to any disclaimer, the term of this patent is extended or adjusted under 35 U.S.C. 154(b) by 511 days.

(21) Appl. No.: 16/672,503

(22) Filed: Nov. 3, 2019

(65) Prior Publication Data
US 2021/0130197 A1 May 6, 2021

(51) Int. Cl.
C02F 1/461 (2006.01)
H05H 1/24 (2006.01)
F24F 11/30 (2018.01)

(52) U.S. Cl.
CPC .............. C02F 1/461 (2013.01); F24F 11/30 (2018.01); H05H 1/2406 (2013.01);
(Continued)

(58) Field of Classification Search
CPC .... C02F 2201/4613; C02F 2201/46135; C02F 2201/4614; C02F 2201/46145; C02F 1/461; C02F 1/78; C02F 1/4608; C02F 1/4672; C02F 2201/46105; C02F 2201/46175; C02F 2103/02; C02F 2303/26; C02F 2201/784; C02F 2303/04;
(Continued)

(56) References Cited

U.S. PATENT DOCUMENTS 4,936,979 A * 6/1990 Brown ................... C02F 1/4606
　　　　　　　　　　　　　　　　　　　　　　　　210/138
5,685,994 A * 11/1997 Johnson ................. C02F 1/505
　　　　　　　　　　　　　　　　　　　　　　　　210/764

(Continued)

OTHER PUBLICATIONS

Jiang, Wenbin, et al., "Effectiveness and Mechanisms of Electromagnetic Field on Reverse Osmosis Membrane Scaling Control During Brackish Groundwater Desalination", Separation and Purification Technology, Sep. 2021, pp. 1-13.
(Continued)

*Primary Examiner* — Xiuyu Tai
(74) *Attorney, Agent, or Firm* — Capitol Patent & Trademark Law Firm, PLLC

(57) ABSTRACT

Harmful biological contaminants are treated using plasma fields. The inventive techniques offer improved results over existing devices and methods.

20 Claims, 16 Drawing Sheets

(52) U.S. Cl.
CPC ............... *C02F 2201/4613* (2013.01); *C02F 2201/4614* (2013.01); *C02F 2201/46135* (2013.01); *C02F 2201/46145* (2013.01)

(58) Field of Classification Search
CPC ............ C02F 2201/4615; C02F 1/4695; C02F 1/469; C02F 1/46109; C02F 1/4602; C02F 2001/46152; C02F 1/4693; C02F 2201/46115; C02F 2001/425; C02F 2201/4616; C02F 2301/026; C02F 2209/03; C02F 1/283; C02F 2209/40; C02F 2209/02; C02F 1/001; C02F 1/441; C02F 1/32; C02F 2303/16; C02F 2201/46125; C02F 2001/422; C02F 2209/05; C02F 2301/043; C02F 2201/003; F24F 11/30; H05H 1/2406; B01F 23/2312; B01F 23/237613; B01F 2101/305; B01J 19/088; B01J 2219/0809; B01J 2219/0813; B01J 2219/0816; B01J 2219/082; B01J 2219/0822; B01J 2219/0841; B01J 2219/0869; B01J 2219/0877; B01D 61/44; B01D 61/54; B01D 2311/24; Y02A 20/131; Y02A 20/124

See application file for complete search history.

(56) References Cited

U.S. PATENT DOCUMENTS

| | | | | |
|---|---|---|---|---|
| 7,432,482 | B2* | 10/2008 | Sedlmayr | H05B 6/70 219/688 |
| 8,562,803 | B2* | 10/2013 | Nyberg | C02F 1/4695 204/632 |
| 9,708,820 | B2* | 7/2017 | Berger | E04G 17/0652 |
| 2015/0232353 | A1* | 8/2015 | Denvir | C02F 1/78 210/150 |

OTHER PUBLICATIONS

Huchler, Loraine, et al., "Can Onsite qPCR Testing Improve Management of Legionella Infections from Cooling Lowers?", the Analyst, Summer 2021, vol. 28, No. 3, pp. 9-18.

\* cited by examiner

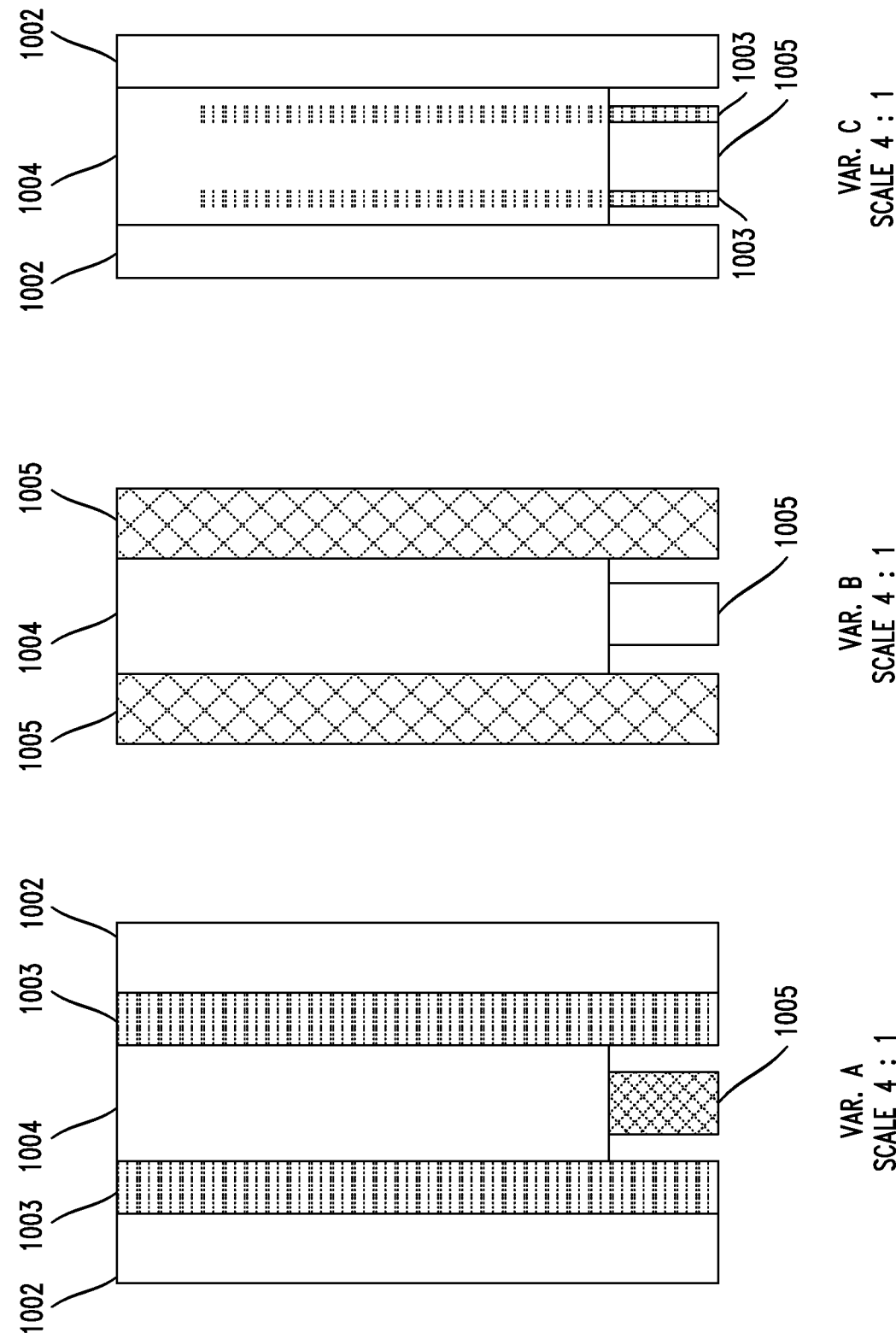

SYSTEMS AND METHODS FOR TREATING HARMFUL BIOLOGICAL CONTAMINANTS IN HVAC SYSTEMS

RELATED APPLICATIONS

The present application is related to U.S. patent application Ser. No. 16/249,184 filed Jan. 16, 2019 (the "'184 Application"), Ser. No. 15/926,965 filed Mar. 20, 2018 (the "'965 Application"), to U.S. patent application Ser. No. 14/624,552 (the "'552 Application"), Ser. No. 14/820,550 (the "550 Application), Ser. No. 14/821,604 (the "'604 Application"), Ser. No. 14/979,501 (the "'501 Application"), Ser. No. 15/069,971 (the "'971 Application"), Ser. No. 15/237,124 (the "'124 Application"), Ser. No. 15/339,578 (the "578 Application") and PCT Application US2017/40838 (the "'838 Application"). This application incorporates by reference herein the entireties of the disclosures of each of the above-identified applications as if set forth herein in full.

INTRODUCTION

This section introduces aspects that may be helpful to facilitate a better understanding of the described invention(s). Accordingly, the statements in this section are to be read in this light and are not to be understood as admissions about what is, or what is not, in the prior art.

Biological contaminants (e.g., bacteria (*Legionella*), biofilms, viruses, and parasites) occur in heating, ventilation and air-conditioning (HVAC) systems. Under the right environmental conditions, these contaminants can be hazardous to the health of individuals that are exposed to the contaminants.

Accordingly, there is a need for devices, systems and methods that effectively treat (i.e., reduce, eliminate) such contaminants.

Additional devices, systems, related methods, features and advantages of the invention will become clear to those skilled in the art from the following detailed description and appended drawings.

BRIEF DESCRIPTION OF THE DRAWINGS

FIG. 4B depicts exemplary spacers that may be used with the probe in FIG. 4A.

FIGS. 7A to 7H depict illustrative displays generated by a graphical user interface in accordance with embodiments of the invention.

Figure 1:
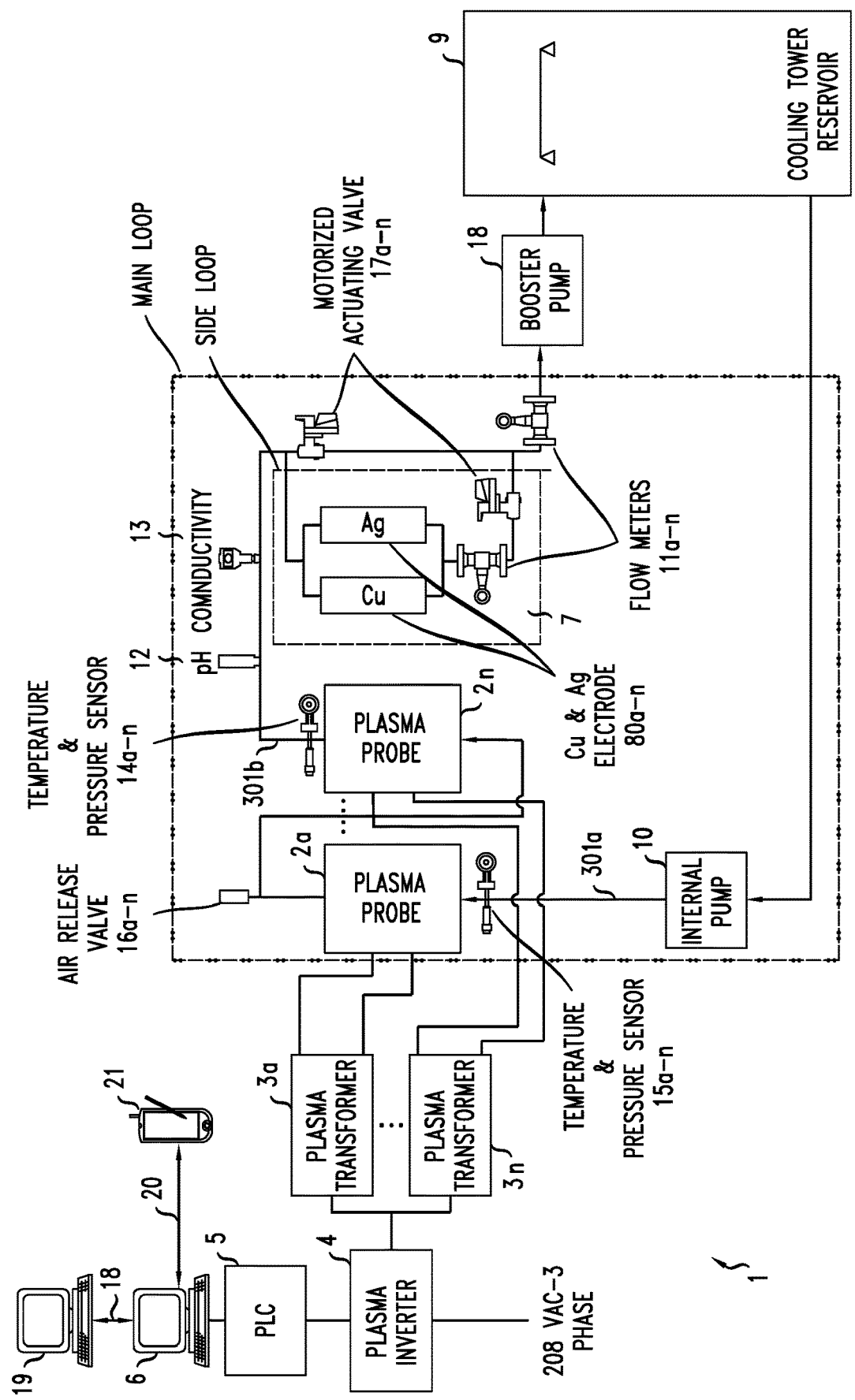
FIG. 1 depicts a system for treating harmful biological contaminants according to one or more embodiments of the invention.

To the extent that any of the figures or text included herein depicts or describes dimensional values (e.g., inches), temperatures, pressures, pHs, conductivities and other parametric values it should be understood that such values are merely exemplary to aid the reader in understanding the embodiments described herein. It should be understood, therefore, that other values may be used to construct the inventive devices, systems and components described herein and their equivalents without departing from the scope of the inventions.

SUMMARY

Devices, systems and related methods for treating harmful biological contaminants are presented. In one embodiment, an exemplary system for treating harmful biological contaminants may comprise: one or more plasma probes for treating harmful biological contaminants in water flowing through each probe, where each probe comprises dielectric barrier discharge elements; backpressure control means for adaptively controlling backpressures exerted on the elements; and an ionization section for further treating the harmful biological contaminants in the water. In such an exemplary system the backpressure control means may comprise a controller for determining whether a pressure exceeds a threshold based on signals received from one or more sensors, the controller being further operable to send signals to an internal pump, first valve or second valve to decrease or increase an amount of water fed to the probes.

The exemplary system may further comprise isolation means for isolating the probes from differences in flow rate of the water, where, in one embodiment, the isolation means may comprise a buffer tank and one or more valves for controlling the flow rate, a water level monitoring sensor for detecting a water level of the buffer tank, wherein the controller further controls a rate at which water should be supplied to, or restricted from flowing to, the buffer tank.

Yet further, the ionization section may comprise one or more electrodes for further treating the water, wherein each electrode may comprise one or more of the following materials: arsenic, antimony, cadmium, chromium, copper, mercury, nickel, lead, silver, or zinc, for example.

In the exemplary system, the controller may be further operable to control a polarity of each the electrodes of the ionization section to control leaching of ions from each of the electrodes.

The exemplary system may further comprise an electromagnetic interference shielded enclosure configured to surround the probes and prevent electromagnetic signals that are generated by the plasma probes within the enclosure from emanating outside the enclosure, a protective splashguard for protecting electronics within the enclosure from being exposed to water from one of the probes, and/or one or more dielectric spacers surrounding conductors for preventing electromagnetic arching from occurring between the enclosure and the conductors.

In addition to the exemplary systems, the present invention provides for related, exemplary methods including, but not limited to, a method for treating harmful biological contaminants that may comprise: treating harmful biological contaminants in water flowing through one or more plasma probes (composed of one or more of arsenic, antimony, cadmium, chromium, copper, mercury, nickel, lead, silver, or zinc materials, for example) adaptively controlling backpressures exerted on elements of each of the plasma probes; and further treating the harmful biological contaminants in the water using an ionization section comprising one or more electrodes.

Such an exemplary method may further comprise determining whether a pressure exceeds a threshold based on signals received from one or more sensors, and decreasing or increasing an amount of water fed to the probes.

Yet further, the exemplary method may comprise isolating the probes from differences in flow rate of the water, by, for example, detecting a water level of a buffer tank positioned in a flow of the water to the probes and controlling a rate at which water should be supplied to, or restricted from flowing to, the buffer tank.

Yet further, the exemplary method may further comprise controlling a polarity of each the electrodes to control leaching of ions from each of the electrodes, and/or surrounding the probes with an electromagnetic interference shielded enclosure.

Additional systems, devices and related methods provided by the invention will become clear to those skilled in the art from the following detailed description and appended drawings.

DETAILED DESCRIPTION, INCLUDING EXAMPLES

Exemplary embodiments of systems, devices and related methods for treating harmful biological contaminants are described herein and are shown by way of example in the drawings. Throughout the following description and drawings, like reference numbers/characters refer to like elements.

It should be understood that, although specific exemplary embodiments are discussed herein, there is no intent to limit the scope of the present invention to such embodiments. To the contrary, it should be understood that the exemplary embodiments discussed herein are for illustrative purposes, and that modified and alternative embodiments may be implemented without departing from the scope of the present invention.

It should also be noted that one or more exemplary embodiments may be described as a process or method. Although a process/method may be described as sequential, it should be understood that such a process/method may be performed in parallel, concurrently or simultaneously. In addition, the order of each step within a process/method may be re-arranged. A process/method may be terminated when completed and may also include additional steps not included in a description of the process/method.

As used herein, the term "and/or" includes any and all combinations of one or more of the associated listed items. As used herein, the singular forms "a," "an" and "the" are intended to include the plural form, unless the context and/or common sense indicates otherwise.

As used herein, the term "embodiment" refers to an example of the present invention.

As used herein, the term "operable to" means "functions to".

As used herein the phrases "treat", "treating," "treatment" and other tenses of the word treat mean the inactivation, mitigation, reduction, removal, minimization, dissolution and elimination of harmful biological contaminants and the prevention of such harmful biological contaminants unless the context indicates otherwise to one skilled in the art.

As used herein the phrase "probe" means an element of one of the inventive devices or systems described herein that may be used to generate and apply plasma energy (e.g., fields) to harmful biological contaminants in order to treat a liquid, such as water or water vapor, that contains harmful biological contaminants.

It should be understood that when the textual description or drawings herein describe a "processor", "microcontroller", "controller", "programmable logic controller (PLC)", "addressable controller", or "computer" (collectively "controller") or an electronic test set that such a device includes stored, specialized instructions for completing associated, described features and functions, such as computations or the generation of control signals, for example. Such instructions may be stored in onboard memory or in separate memory devices. Such instructions may comprise an application or APP (e.g., an application that is especially downloaded by a user to a mobile device) for completing one or more of the inventive functions or features described herein. Such instructions are designed to integrate specialized functions and features into the controllers and test sets that are used to complete inventive functions, methods and processes related to treating harmful biological contaminants by controlling one or more inventive systems or devices/components used in such a treatment. Such instructions, and therefore functions and features, are executed by the controllers and test sets described herein at speeds that far exceed the speed of the human mind and, therefore, such features and functions could not be completed by the human mind in the time required to make the completion of such features and functions reasonable to those skilled in the art. Further, the inventors know of no existing prior art where the human mind has been used in place of the controllers or test sets to complete the features and functions described herein.

It should be understood that an "APP" may include "content" (e.g., text, audio and video files), signaling and configuration files. For the sake of convenience and not limitation, the terms "APP" or "application" may be used herein to refer to any application, but use of such a term also includes a reference to any file or data.

In one embodiment, an APP to be downloaded onto a user device may also reside or be stored on one or more hardware devices, such as a server in whole and/or in part, the later indicating that the APP may be distributed among, and by, several devices. An APP may be downloaded to a user device from an APP server (or servers) or have been otherwise provided and installed on such a server. A given user device may have a need for one or more of the APPs installed on a server. Accordingly, each of the embodiments described herein includes protocols, necessary hardware, software and firmware resident on a user device for transmitting and receiving (i.e., "transceiving") an APP, content and/or content identification information relating to the APP from/to a server and vice-versa. Depending on the content to be transmitted, an APP may be installed directly on a user device or may be downloaded from a server by initiating a request to a server to receive a local copy of the APP. When a discussion herein describes the sending and reception of data (i.e., transmissions and receptions) from/to a user device to/from a platform, a web browser and/or APP may be used to complete such transmissions and receptions.

In one embodiment, a system comprising a device for applying plasma energy to harmful biological contaminants in water or water vapor (referred to collectively hereafter as "water") may be combined with an electrolytic ionization section or chamber to reduce harmful biological contaminants. Such a section or chamber may be operable to convert metals with biocidal properties into each metal's respective ions, where the ions may be used to inactivate biological contaminants.

Referring now to FIG. 1, there is depicted a system 1 for treating harmful biological contaminants according to an embodiment of the invention. For purposes of simplifying the explanation that follows the system 1 is depicted as comprising a number of distinct subsystems and devices, though it should be understood that one or more of these subsystems and devices may be combined into fewer subsystems and devices or expanded into more subsystems and devices. Further, though the system 1 is depicted as being used to treat harmful biological contaminants in water that is fed to a reservoir of a cooling tower 9, it should be understood that the system 1 may be is used to treat harmful biological contaminants in a number different applications other than water fed to a cooling tower.

As shown, system 1 may comprise one or more plasma probes 2a to 2n (where "n" indicates the last probe), one or more plasma transformers 3a to 3n, where in one embodiment each transformer 3a to 3n may be connected to a separate probe 2a to 2n, and a plasma inverter 4. It should be noted that though only two probes are depicted in FIG. 1 this is merely exemplary and non-limiting. The number of probes may match the treatment parameters of a given application.

Continuing, the system 1 may also include an ionization section that comprises one or more electrodes 80a to 80n, one or more internal pumps 10, one or more programmable logic controllers 5 and a central controller 6. In embodiments, the functions completed by the central controller 6 may be completed by a specialized computer co-located with the elements of system 1, or may be completed by a specialized computer located at a remote location (i.e., not co-located) or may be partially completed by a specialized computer co-located with the elements of system 1 and partially completed by a specialized computer 19 located at a remote location that is connected to the controller 6 via a wired, wireless or some combination of the two communications channel 18.

Continuing with the description of the system 1 depicted in FIG. 1, the system 1 may also include one or more sensors 12 to 15a-n (e.g., pH and conductivity sensors, 12, 13, respectively, temperature and pressure sensors 14a-n, 15a-n, respectively) and air and liquid control devices 11a-n, 16a-n, 17a-n (e.g., flow meters 11a-n, air release valves 16a-n and motorized actuating valves 17a-n). In more detail, the control devices may include magnetic flow meters 11a-n that function to detect, among other things, the level of water in each probe. In an embodiment, the flow meters 11a-n function to insure water is flowing into the probe(s) 2a-2n so that when the probes 2a-2n generate plasma streamers (discussed elsewhere herein) the streamers are discharged in the water, and not into air. A flow meter 11a-n is operable to detect water entering a probe 2a-2n from the bottom (for example) and the water level as the water fills the entirety of a probe 2a-2n. If the flow meter 11a-n detects that a probe 2a-2n does not have sufficient water then a signal may be generated and sent to a controller 6, for example, to control the flow of water into a probe 2a-2n and/or to shut the operation of a probe 2a-2n down in order to protect the physical integrity of the probe. In more detail, during a probe's 2a-2n operation it will generate plasma streamers (see discussion elsewhere herein). If a probe 2a-2n is not full of water (or another liquid) the streamers will discharge (i.e., occur) in air that fills the probe. Such a discharge causes the temperature within a probe 2a-2n to increase and may cause the probe 2a-2n to eventually crack and leak. To avoid this from occurring, water, which acts as a coolant, should fill each probe such that when a streamer is discharged it discharges into the water to reduce overheating of a probe 2a-2n.

In one embodiment, the plasma probes 2a to 2n may be configured in-line with a main loop of a water circulation system that feeds the cooling tower 9 while components of the ionization section may be configured in a side loop of the water circulation system.

As described in more detail herein, the system 1 may be configured to adaptively control the pressures being exerted on electrodes that make up plasma probes 2a to 2n due to the changes in backpressures that build up due to changes in the flow of liquid (e.g., water) traveling through system 1.

In more detail, water flows into the probes 2a-2n via inlet 301a where the water may be treated as described in more detail herein to eliminate, remove or at least reduce harmful biological contaminants, such as legionella. After passing through probes 2a to 2n the so treated water may then pass to electrodes 80a to 80n of the ionization section. In an embodiment of the invention, the ionization section may be operable to treat additional bacteria and other harmful materials in the water as described further herein.

As depicted in FIG. 1, main loop valve 17a may be operable to control the flow of water to the reservoir 9, and alternatively, to electrodes 80a to 80n of the ionization section. For example, when the valve 17a is open a first portion of the water from probes 2a to 2n may flow into electrodes 80a to 80n while a second portion may flow to reservoir 9. In an embodiment of the invention, the percentage of water that flows into electrodes 80a to 80n versus the percentage that flows to reservoir 9 may depend on the water pressure generated by the electrodes 80a-n compared to the water pressure within reservoir 9, or vice-versa. For example, if the pressure within electrodes 80a to 80n (or within chamber 7 enclosing the electrodes) is higher than the pressure within reservoir 9 then water may not flow into electrodes 80a to 80n and may attempt to flow towards reservoir 9. In certain instances, however, sudden changes in pressures may result in water backing up towards probes 2a to 2n instead of moving towards reservoir 9, These pressures may be referred to as "backpressures". Such backpressures, if high enough may damage the elements of probes 2a to 2n. For example, backpressures may cause dielectric barrier discharge elements of probes 2a to 2n to fail (i.e., crack, break).

To prevent or substantially reduce the chances that pressure spikes may damage elements of probes 2a-2n the present invention provides for backpressure control means for adaptively controlling backpressures exerted on the elements to reduce backpressures. In one embodiment, such means may comprise an internal pump 10 that is operating to feed water into probes 2a to 2n, main loop valve 17a and side loop valve 17n that may be controlled to reduce or prevent such backpressures. Such means may further comprise sensors 14a-n and 15a-n. In an embodiment, the pressures being applied to elements of probes 2a-2n may be determined by comparing the pressure measured at the input of probes 2a to 2n by sensors 15a-n to the pressure measured at the output of probes 2a to 2n by sensors 14a-n (e.g., the difference between each measured pressure). The sensors 14a-n and 15a-n may transmit the so measured pressures to a controller, such as central controller 6 or a local PLC (not shown in FIG. 1) that may be a part of the backpressure control means. In either case, if a controller or PLC determines that the determined pressure exceeds a threshold then the controller or PLC may be operable to send electrical signals to internal pump 10, valve 17a and/or 17n to, for example, reduce the amount of water (and its corresponding pressure) that is being fed to probes 2a to 2n by pump 10, and/or open or close valve 17a and/or open or close valve 17n. Said another way, the pump 10 and valves 17a, 17b may be controlled in order to relieve some of the pressure (i.e., pressure spikes) being applied to probes 2a to 2n in order to reduce the chances that the probes 2a to 2n may be damaged by such pressure spikes. In embodiments, the signals received by the pump 10 and valves 17a and/or 17n may be used by pump 10 and valves 17a, 17n in order to variably adjust the flow of water being sent to probes 2a to 2n by pump 10 and/or the flow of water through each valve, respectively. That is to say, upon receiving the signals the pump 10 and/or valves 17a, 17n may be operable to adjust their respective structure so that the pump and/or each valves allow a flow of water that results in a pressure differential or gradient across the probes 2a to 2n that is below a threshold. In more detail, the amount of water being fed to the probes 2a to 2n by the internal pump 10 may be reduced or increased depending on the signal received by the pump 10. Alternatively, or substantially simultaneously, the structure of valve 17a and/or 17n may be adjusted to completely open, completely close or partially open or partially close depending on the signal received by each valve 17a, 17n. The degree to which each valve is partially opened may vary. Said another way, each valve 17a, 17n may be operable to vary the flow of water therethrough using a plurality of steps, e.g., step 1 is 75%, step 2 is 50% and step 3 is 25%.

Figure 8A:
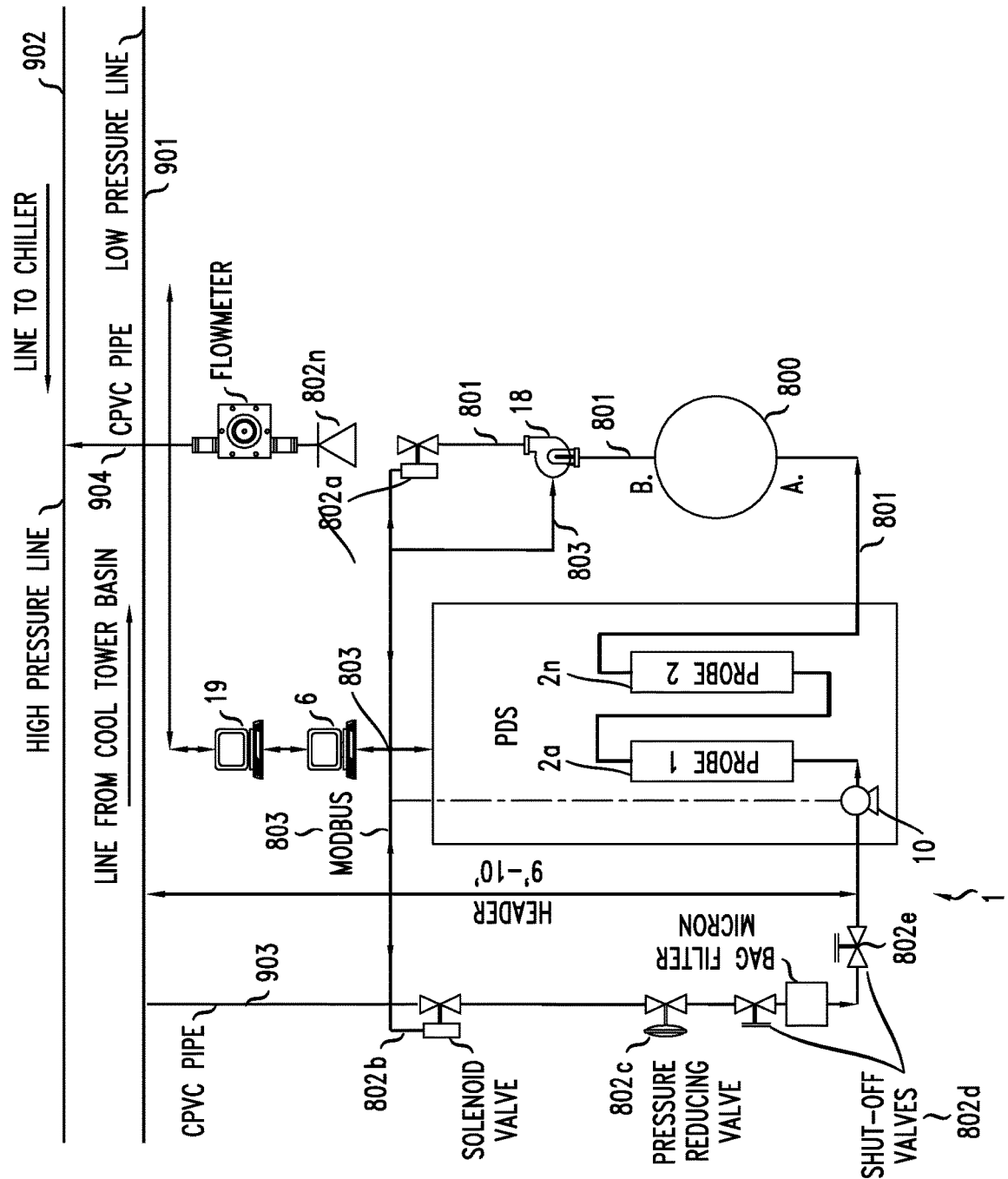
FIGS. 8A and 8B illustrate the design of a system for isolating one or more plasma probes to avoid damage to the probes due to pressure spikes.

Referring now to FIG. 8A there is depicted an exemplary set-up of a system 1 for isolating one or more plasma probes 2a to 2n to avoid damage to the probes due to additional changes or differences in flow rate (e.g. pressure spikes). As previously mentioned, system 1 includes a booster pump 18. In one embodiment, the booster pump 18 functions to increase the flow rate of water flowing through it so that the water output from the pump 18 may effective combine or mix with water that is flowing at a higher pressure (e.g., 20 PSI) from a cooling tower reservoir 9 to a chiller. Absent the booster pump, the treated water would not be able to sufficiently mix with water that is directed towards the chiller.

In some instances this increase in flow rate may inadvertently damage components of system 1. For example, during the start-up and/or shutdown of probes 2a to 2n pulsating water (or another liquid) from the booster pump 801 impeller may cause a change in the flow rate, which in turn may result in pressure spikes that travel back through piping towards the plasma probes 2a to 2n. To avoid damage to the probes 2a to 2n due to such differences in flow rate (e.g., spikes) the inventors provide an isolation means for isolating the probes from such changes in flow rates.

In an embodiment the means may comprise a buffer tank 800, connective piping 801 and valves 802a-n for controlling the flow rate. The combination of the tank, piping and valves functions to absorb the differences in flow rate (e.g., increases in water pressure due to pressure spikes). Without such an isolation means (or its equivalent) to isolate the plasma probes 2a to 2n (as well as other components of system 1) from flow rate differences (e.g., pressure spikes caused by pulsating water from the booster pump 18 or high constant pressures), the flow rate may ultimately cause the quartz plate(s) making up elements of each plasma probe 2a to 2n to fail (e.g., crack) and leak.

In one embodiment, the flow rate of water flowing into and out of the tank 800 may be controlled between 18 to 22 GPM, for example. Control of the flow rate may be accomplished by the receipt of control signals at the pump 18 from a controller 6, for example. Controller 6 may send signals to the pump via communication lines 803 to control the speed of the pump 18, control the on/off cycle of the pump, control (vary) the opening of a solenoid-actuated ball valves 802a,b and control the start-up/shut-down flow rates.

Further, the inventors discovered that inclusion of the buffer tank 800, connective piping 801, valves 802a-n and controls discussed above minimized the number of booster pump 18 on/off cycles, thereby allowing the plasma probes 2a to 2n to receive water that is flowing at a constant positive pressure. Yet further, the controller 6 may control the flow of water to the tank 800 in order to reduce the risk that the buffer tank 800 may overflow or become empty.

Figure 8B:
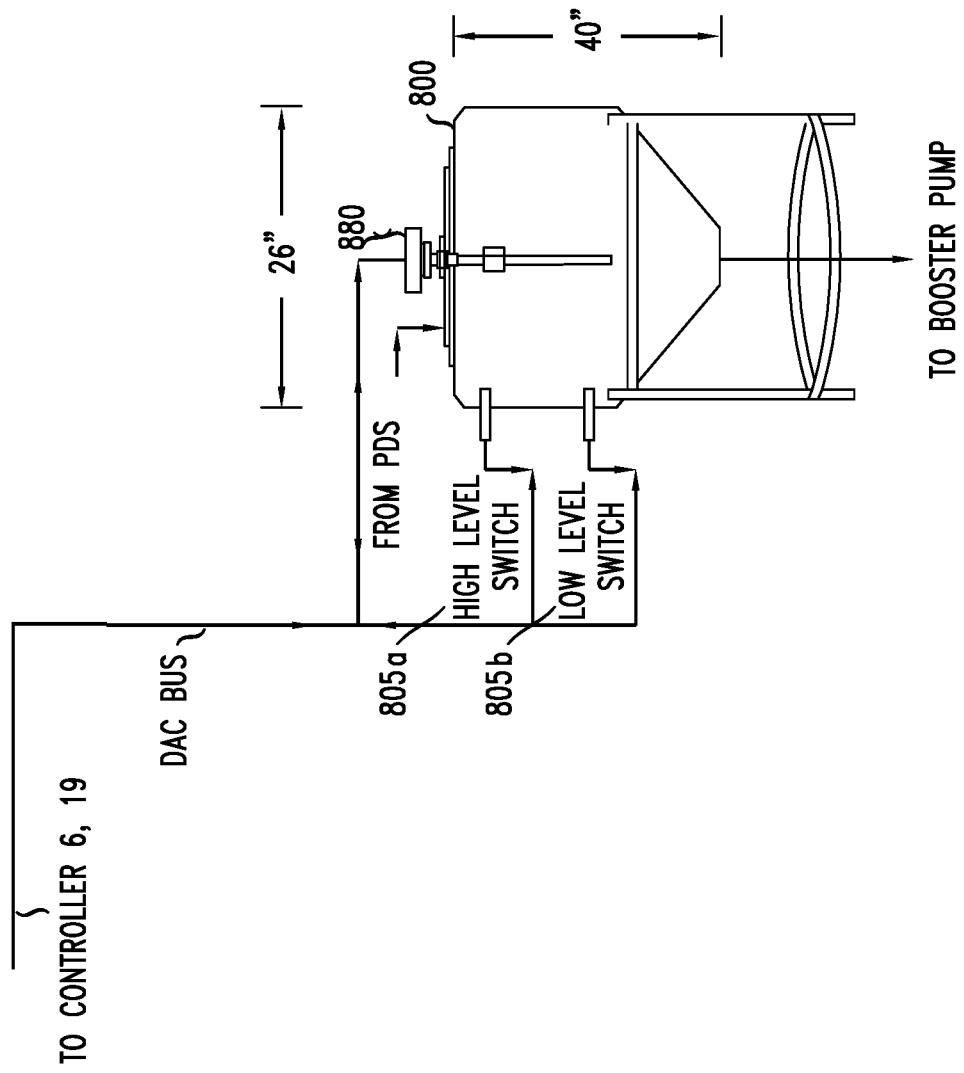

Referring now to FIG. 8B, in one embodiment the isolation means may further comprise a continuous water level monitoring sensor 810 in combination with controller 6 for detecting a water level of the buffer tank 800, wherein the controller 6 may be operable to control a rate at which water should be supplied to, or restricted from flowing to, the buffer tank 800. For example, the sensor 810 may detect when the water level is approaching, or has reached, one or more minimum and/or maximum threshold water levels. In an embodiment, if the sensor 810 detects one or more of the minimum or maximum threshold water levels, the sensor 810 will send a signal to a control system, such as controller 6. Upon receiving such a signal the controller 6 may process the signal and determine the rate at which water should be supplied to, or restricted from flowing to, the tank 800 in order to alleviate an overflow/underflow. Still further, in an embodiment the controller 6 may store one or more default, threshold water levels for the tank 800 that may be compared to any signal the controller 6 it receives from the sensor 805a, 805b, 810 where such defaults prevent an overflow or underflow condition.

In addition to sensors, water level switches 805a, 805b may also installed in the buffer tank 800 to detect critical high and low water levels. If either of the switches 805a,b are triggered, a potential failure may be indicated. For example, if a switch 805a for detecting a high water level is triggered (detects a value that indicates a high water level), a signal may be sent to controller 6. Thereafter, controller 6 may process such a signal and execute a series of instructions aimed at identifying the cause of the trigger. In one scenario, the cause may be that the internal pump 10 may be broken or not operating optimally. Alternatively, there may be a blockage or a leak in a plasma probe, buffer tank, and internal pipes. Conversely, if a switch 805b for detecting a low water level is triggered (detects a value that indicates a low water level), a signal may be sent to controller 6. Thereafter, controller 6 may process such a signal and execute a series of instructions aimed at identifying the cause of the trigger. In one scenario, the cause may be that the booster pump 18 is broken or not operating optimally. Alternatively, there may be a blockage or a leak in the pipes from the low pressure line and/or the pipes from the buffer tank to the high pressure line in FIG. 8B. In either the high level or low level scenario, the switches 805a,b may send signals to the controller 6, for example, in order to alert service personal to the existence of a problem.

We now turn to a more detailed discussion of the plasma probes 2a to 2n, transformers 3a to 3n and inverter 4.

Figure 2:
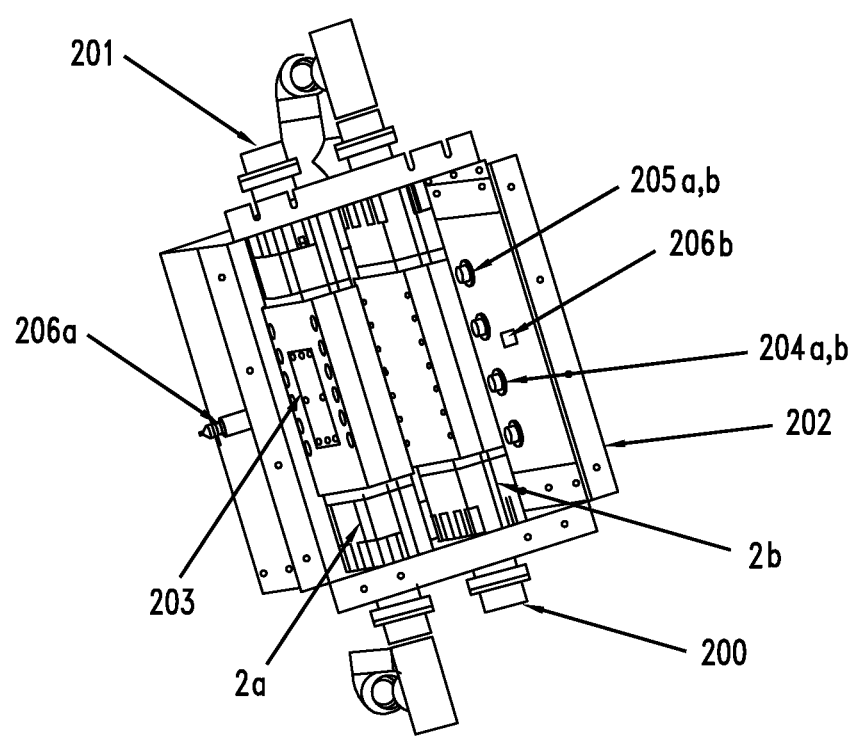
FIG. 2 depicts an exemplary configuration of two plasma probes according to an embodiment of the invention.

Referring to FIG. 2, there is depicted a close-up view of an exemplary probe configuration. In the embodiment depicted in FIG. 2 two plasma probes 2a, 2b are depicted within an enclosure 202. However, it should be understood that any number of plasma probes may be incorporated into system 1 depending on the flow rate of water needed to be treated or treatment rate of harmful biological contaminants desired, among other things.

Water (or another liquid containing harmful biological contaminants) may flow into fluid inlet 200 where it may then be treated by probes 2a,2b within enclosure 202. The so-treated water may then flow out of the enclosure 202 via fluid outlet 201. In an embodiment, the enclosure 202 may comprise an electromagnetic interference (EMI) shielded enclosure configured to surround the probes 2a, 2b and to prevent electromagnetic signals that are generated by the plasma probes 2a, 2b within the enclosure 202 from emanating outside the enclosure 202. By eliminating or substantially reducing such emissions the enclosure 202 prevents signals generated by the probes 2a, 2b from harming individuals or other electronic equipment outside the enclosure 202 (e.g., electronic controllers that control chillers) or otherwise prevents such signals from interfering with the proper operation of such equipment. In one embodiment, the enclosure may function to attenuate such signals at a level of 80 to 90 dB, for example. Further, each probe (or a group of probes) 2a, 2b may be surrounded by a protective splashguard (not shown in FIG. 1). In an embodiment, the splashguard(s) function to protect the electronics within the enclosure 202 from being exposed to a liquid should one of the probes 2a,2b leak such fluid.

Electrical power may be provided to each of the probes 2a,2b via electrical conductors 205a, b (only conductors connected to probe 2b are shown in FIG. 2, though similar conductors are connected to probe 2a). To prevent dangerous electromagnetic arching from occurring between the enclosure 202 and the conductors 205a,b each of the conductors 205a,b may be surrounded by one or more dielectric spacers 204a,b (only spacers surrounding conductors 205b for probe 2b are shown in FIG. 2, though similar spacers may be used with conductors for probe 2a).

Also shown in FIG. 2 are temperature sensors 206a,b wherein the first sensor 206a may be operable to detect the temperature of the probe 2a and the second sensor 206b may be operable to detect the temperature of the probe 2b. In an embodiment, the sensors 206a,b may comprise infrared (IR) sensors that function to detect a wide range of temperatures, e.g., 0 to 1000° 1000 F. In an embodiment, if the sensors detect a temperature that approaches 60° C. (140° F.) then the system 1 (e.g., controller 6) may be operable to remove the power being supplied to the probes 2a,2b, in effect shutting them off.

In the embodiments depicted in FIGS. 1 and 2 the probes 2a,2b are configured in series where water flows through the inlet 200 into the first probe 2a and is treated, and then is fed by piping (not shown in figures) into the second probe 2b for additional treatment before exiting via outlet 201. It should be understood, however, that inventive probes may be configured in series or in parallel.

Figure 3A:
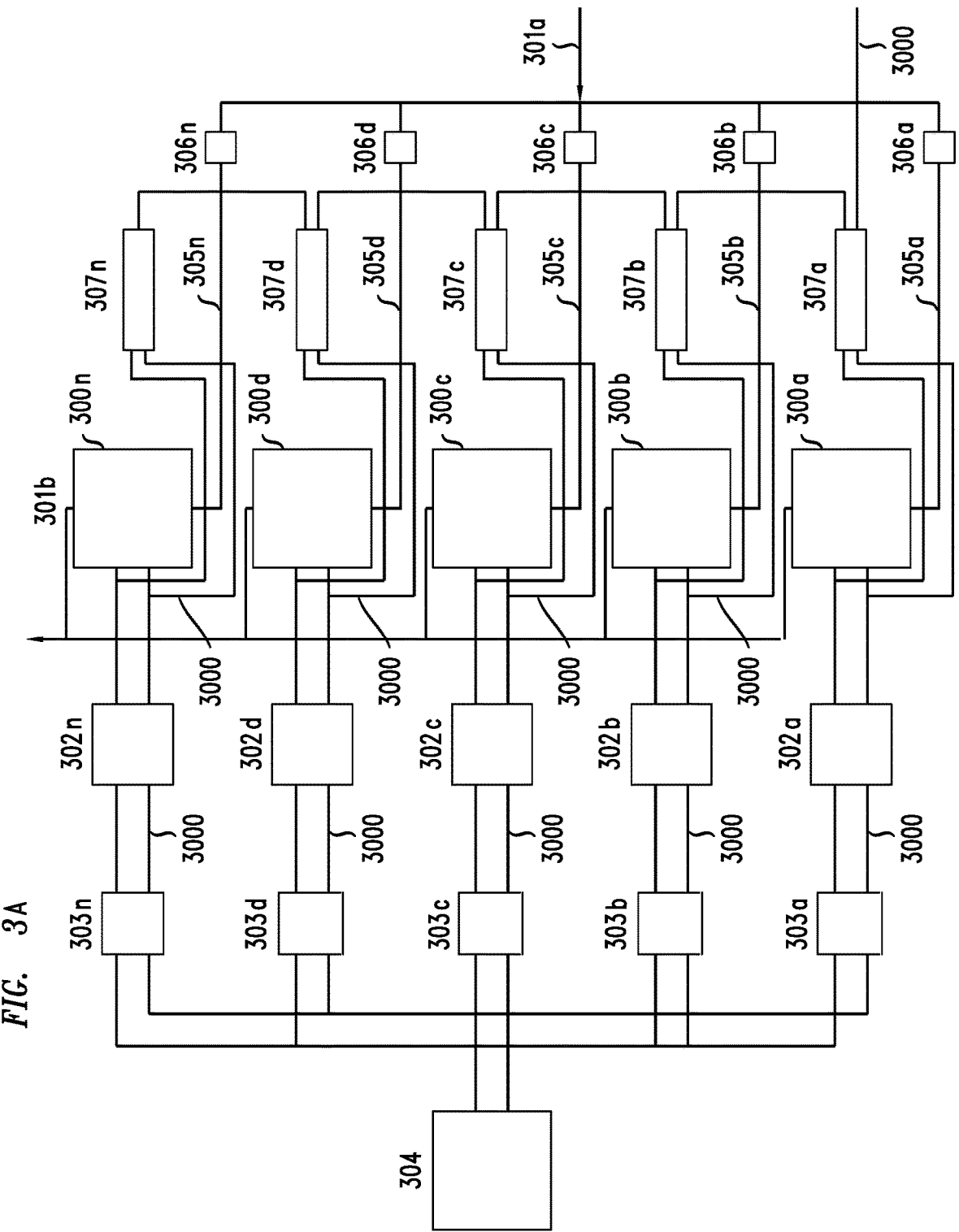
FIGS. 3A and 3B depict exemplary configurations of plasma probes in series and parallel.

For example, FIG. 3A depicts a simplified block diagram of a plurality of probes 300a to n (where "n" indicates the last probe) configured in parallel to treat harmful biological contaminants contained in a liquid, such as water, that is input via inlet 301a. Though five probes 300a to 300n are depicted in FIG. 3A it should be understood that more or less probes may be configured in parallel. In the embodiment depicted in FIG. 3A, each of the plasma probes 300a to n is connected to a separate, associated plasma transformer 302a to n (or transformers 3a to 3n in FIG. 1), which in turn are connected to separate tuning inductors 303a to n. All of the inductors 303a to n, in turn, may be connected to a plasma inverter 304 or inverter 4 in FIG. 1).

As the liquid (e.g. water) flows into the inlet 301a it may be divided into a number of separate treatment streams and transported to probes 300a to 300n by pipes 305a to 305n for treatment before being output via outlet 301b. In an embodiment, the pressure within each stream in pipes 305a to n may be measured and controlled by backpressure means 306a to 306n. In one embodiment means 306a-n may comprise a type of balancing valve (e.g. pressure-independent flow control valve, automatic system-powered flow limiting valves, standard ball or butterfly valves, calibrated balancing valves) that may function to measure or detect a maximum of 15 to 20 PSI of pressure.

Also depicted in FIG. 3A are addressable controllers 307a to n (e.g., PLCs such as PLC 5 in FIG. 1). In one embodiment, each addressable controller 307a to n may be associated with a separate communication address such that a centralized controller (not shown in FIG. 3A), such as controller 6 in FIG. 1, may be operable to communicate and exchange specific instructions with a specific controller, rather than all controllers, via an electronic bus 3000 (e.g., conductive wire, cable). Further, each controller 307a to n may be operable to receive such instructions and thereafter, further operable to control the operation and functions of one probe, one transformer, and one inductor based on such instructions and/or based on stored instructions with a respective controller 307a to n via communications bus 3000, for example. In an embodiment, as explained in more detail herein, the voltage and frequency being applied to each probe 300a-n by a respective transformer and inverter may be controlled (i.e., adjusted) to insure each probe 300a-n is operating at a resonance frequency.

In an alternative embodiment, centralized controller, such as control system 6 in FIG. 1, may be operable to communicate and exchange specific instructions with all of the controllers 307a to n substantially simultaneously, or some subset of all of the controllers 307a to n substantially simultaneously, by sending its communications (e.g., electronic instructions) to respective controllers 307a-n using the electronic address of such controllers 307a to n. Thereafter, each controller 307a to n may be operable to receive such instructions and may be further operable to control the operation and functions of one or more of the probes 300a to n, transformers 302a to n, and inductors 303a to n and the inverter 304 via bus 3000, for example.

Figure 3B:
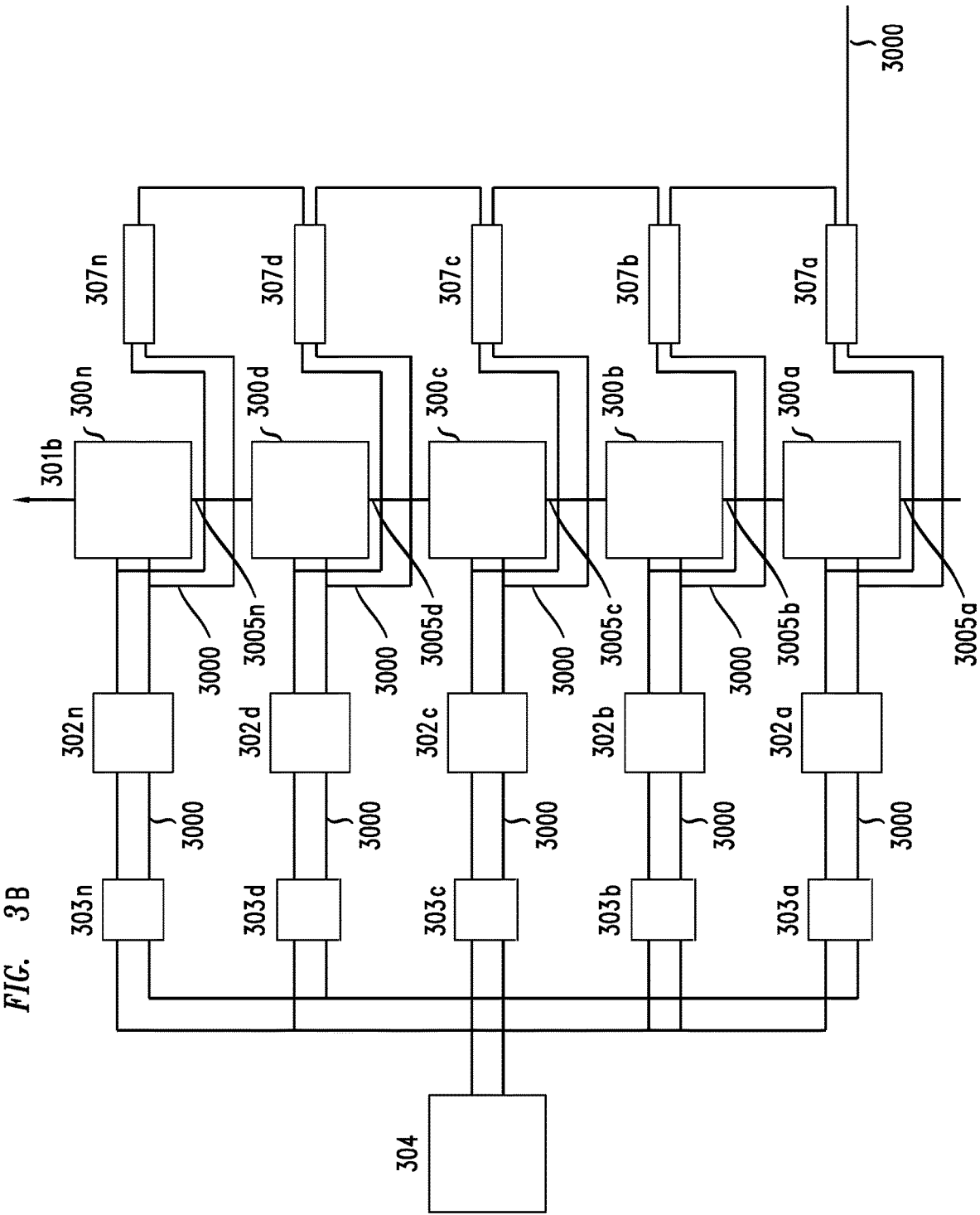

Similarly, a plurality of probes may be configured in series. For example, FIG. 3B depicts a simplified block diagram of a plurality of probes 300a to n (where "n" indicates the last probe) configured in series to treat harmful biological contaminants contained in a liquid, such as water, that is input via inlet 301a. Though five probes 300a to 300n are depicted in FIG. 3B it should be understood that more or less probes may be configured in series. In the embodiment depicted in FIG. 3B, each of the plasma probes 300a to n is again connected to a separate, associated plasma transformer 302a to n (or transformers 3a to 3n in FIG. 1),), which in turn are connected to separate tuning inductors 303a to n. All of the inductors 303a to n, in turn, may be connected to a plasma inverter 304 or inverter 4 in FIG. 1).

As the liquid (e.g. water) flows into the inlet 301s it remains in one treatment stream as it is fed to, and treated by, each individual probe 300a to 300n in series (one after the other) via pipes 3005a to n and then is output via outlet 301b. In an embodiment, the backpressure within the stream may be measured and controlled as described elsewhere herein.

Also depicted in FIG. 3B are addressable controllers 307a to n (e.g., PLCs such as PLC 5 in FIG. 1). In one embodiment, each addressable controller 307a to n may be associated with a separate communication address such that a centralized controller (not shown in FIG. 3B), such as controller 6 in FIG. 1, may be operable to communicate and exchange specific instructions with a specific controller, rather than all controllers, via an electronic bus 3000 (e.g., conductive wire, cable). Further, each controller 307a to n may be operable to receive such instructions and thereafter, further operable to control the operation and functions of one probe, one transformer, and one inductor based on such instructions and/or based on stored instructions within a respective controller 307 a to n via bus 3000, for example.

In an alternative embodiment, centralized controller, such as control system 6 in FIG. 1, may be operable to communicate and exchange specific instructions with all of the controllers 307a to n substantially simultaneously, or some subset of all of the controllers 307a to n substantially simultaneously, by sending its communications (e.g., electronic instructions) to respective controllers 307a-n using the electronic address of such controllers 307a to n. Thereafter, each controller 307a to n may be operable to receive such instructions and may be further operable to control the operation and functions of one or more of the probes 300a to n, transformers 302a to 302n, and inductors 303a to n and the inverter 304 via bus 3000, for example.

In an embodiment, each of the probes 2a to 2n may comprise a plurality of cascaded, single slot double dielectric barrier discharge (DDBD) electrodes, or alternatively, a number of cascaded, single planar dielectric barrier discharge (DBD) electrodes. The number of each type of electrode that can be cascaded and contained within a probe 2a to 2n may depend on the mass flow rate of the particular industrial application, for example. In an embodiment, between each DDBD electrode may be configured a glass filled Polyoxymethylene (commonly referred to as Delrin) spacer, for example where the plurality of DDBD electrodes and spacers may be fastened or otherwise connected together using compression fittings.

Figure 4A:
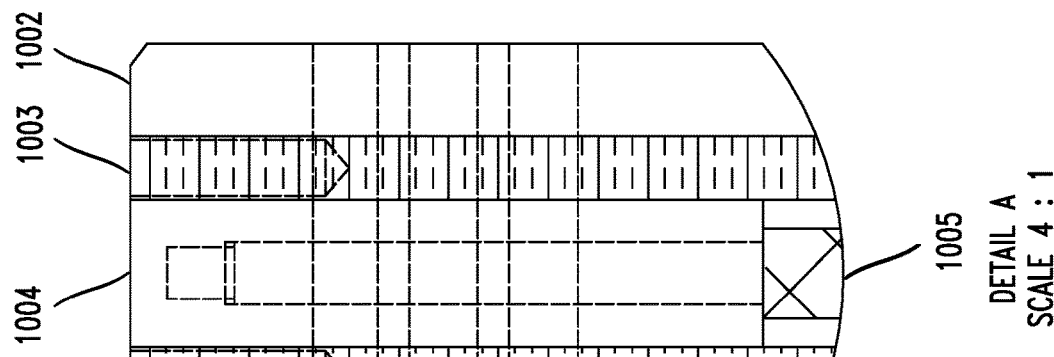
FIG. 4A depicts exemplary sections of a type of plasma probe according to an embodiment of the invention.
Figure 4A:
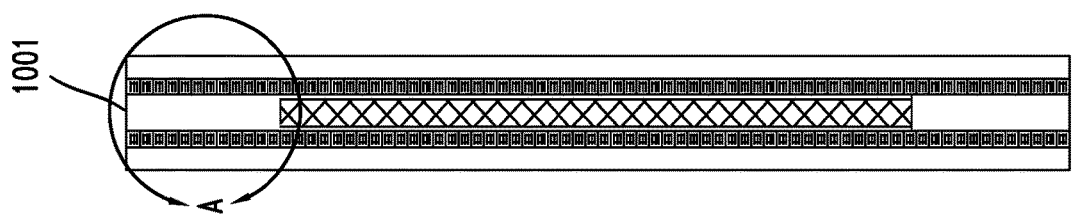

Referring now to FIG. 4A there is depicted exemplary sections of a DDBD probe 2a. As depicted each slot 1001 may comprise at least two negative cathode electrodes 1002, Mica isolation section (e.g., sheet, plate) 1003, slotted Mica laminate fitting 1004 and a positive anode electrode 1005.

As water flows between the gaps (e.g., 2-to 4-millimeter gaps) between the anode electrode 1005 and each cathode electrode 1002, the water may be subjected to plasma energy applied by the electrode configuration. As a result, content (e.g., harmful biological contaminants) in the water may be ionized to form the molecules and ions used to treat (eliminate or substantially reduce) harmful and unwanted biological contaminants (biofilm, Legionella bacteria, etc.) and reduce biologically induced corrosion. In embodiments, the plasma energy may comprise partial and full discharges.

As understood by those skilled in the art, a type of discharge known as a streamer or filamentary discharge is a type of transient electrical discharge. Streamer discharges ("streamers" for short) can form when an insulating medium (for example air molecules in water) is exposed to a large potential difference. For example, when the electric field created by an applied voltage from a probe 2a to 2n is sufficiently large, accelerated electrons strike air molecules in the water with enough energy to knock other electrons off them, ionizing them. The freed electrons go on to strike more molecules in a chain reaction. These electron avalanches (i.e., Townsend discharges) create ionized, electrically conductive regions in the air near an electrode creating the electric field. The space charge created by the electron avalanches gives rise to an additional electric field. This field can enhance the growth of new avalanches in a particular direction, allowing the ionized region to grow quickly in that direction, forming a finger-like discharge—i.e., a streamer.

Streamers are transient (exist only for a short time) and filamentary, which makes them different from corona discharges.

As used herein the phrase "streamer" may be used synonymously with the phrase "partial discharge" to distinguish such discharges from full discharges.

The application of plasma energy to the water in the gaps between an anode 1005 and each cathode 1002 electrode may first cause a streamer and then an arc to form in the water. That is to say, an ionized path created by streamers may be heated by a large current, thus forming an arc. To prevent such arcs (i.e., arcing across slots), a Mica fitting 1004 is included that functions to separate each slot from one another. Further, spacers 906 may be included in a probe 2a to 2n that function to electrically isolate the cascaded slots from an outer housing that encloses one or more probes 2a to 2n (not shown in FIG. 4A).

In an embodiment, a gas distribution system (not shown in FIG. 4A) may inject air into the top and bottom of each slot through the Mica fitting 1004. The introduction of compressed air functions to increase ozone generation in the water 112.

Figure 4C:
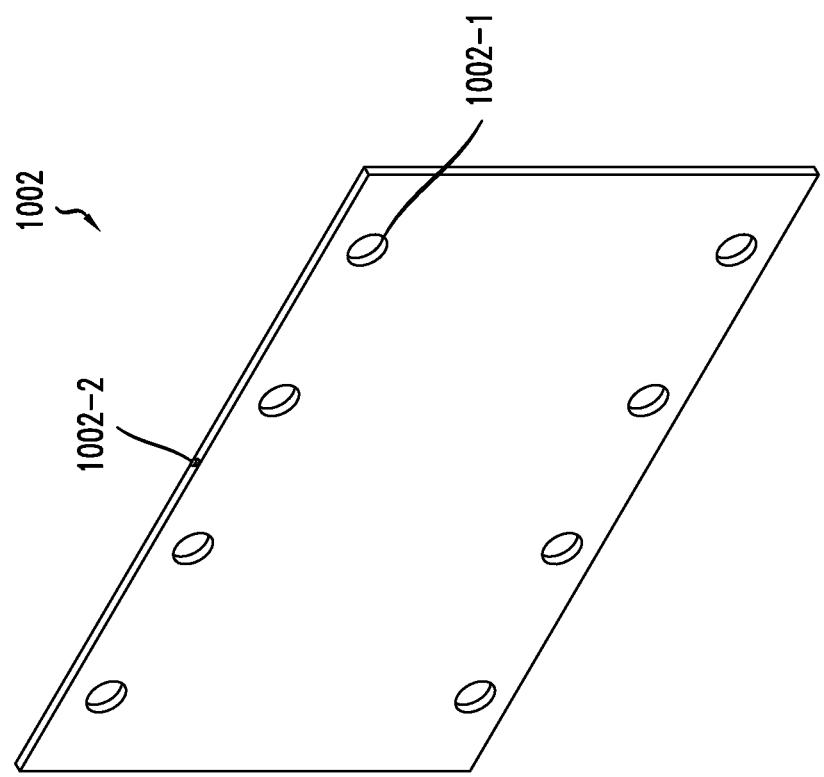
FIGS. 4C and 4D depict exemplary configurations of anode and cathode electrodes according to an embodiment of the invention.
Figure 4D:
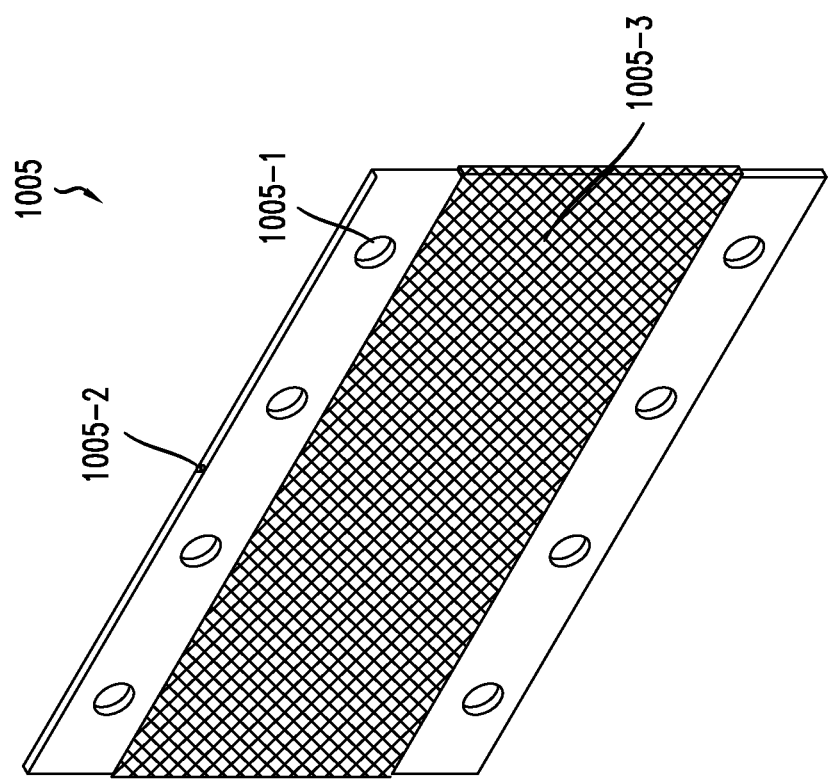

Referring now to FIGS. 4C and 4D, there are depicted exemplary configurations of an exemplary, inventive cathode and anode electrodes 1002, 1005. In embodiments, the electrodes may either be non-porous or comprise porous, aluminum oxide plasma sprayed stainless steel 316 L plates. When plain electrodes are used, the electrodes may be coated to increase their conductivity, and to decrease the voltage necessary to generate streamers in the feed water.

In one embodiment the electrodes (anode 1005 and cathode 1002) may comprise planar electrodes made from a 316L stainless steel. An exemplary anode electrode may have the dimensions of 280 mm by 180 mm by 1 mm thickness and may be coated with a 5-micron Aluminum Oxide $AL_2O_3$ layer that has a 5% porosity, a permittivity ($\varepsilon_r$) of 8-10, and conductivity ($\sigma$) of 2 µS/cm. Exemplary cathode electrodes may have dimensions of 280 mm by 180 mm and may be laminated with 280 mm by 180 mm by 1 mm thickness (length versus width versus thickness) Mica sheets, such as sheets 1003. The Mica sheets 1003 may be configured to function as dielectric barriers and may have a permittivity ($\varepsilon_r$) of 8-10.

Referring now to FIG. 4B there is depicted alternative electrode configurations according to embodiments of the invention. As shown, one configuration (labelled "VAR A") may comprise a DDBD electrode with Mica sheets 1003 between the anode 1005 and cathode electrodes 1002, as well as a porous plasma sprayed anode plate 1005. Another configuration (labelled "VAR B") may comprise a DBD electrode with porous plasma sprayed cathode electrodes 1005, and a non-porous stainless steel 316 L anode electrode 1002, while yet a third configuration ("VAR C") comprises a DBD electrode with a Mica sheets 1003 adjacent a non-porous anode electrode 1002 and a non-porous stainless steel 316 L cathode electrode 1002.

The output voltage supplied by the plasma inverter 4 to the electrodes 1002, 1005 may be used by the electrodes

1002, 1005 to generate extremely high electric field strengths (E) in the order of 150 kV/cm at atmospheric pressure with electron densities between $10^{14}/cm^3$ and $10^{15}/cm^3$, and a current density, J, between 75 A/$cm^2$ and 225 A/$cm^2$, where the current density is based on the product of the electric field strength and the complex conductivity ($\sigma$) of the feedwater and Mica fittings 1004, namely:

$$J=\sigma E \qquad (1)$$

In embodiments, the generation of electric fields with such high electric field strengths creates the before-mentioned streamers in the gaps between an anode and its adjacent or corresponding cathode electrodes.

As noted previously, electrodes may be coated or otherwise include either a layer (i.e., sheet) of aluminum oxide or Mica laminate on their surface. In embodiments, either type of layer may function to redistribute an electric field during a plasma energy pre-discharge phase. In addition, in embodiments where the relative permittivity and conductivity of the water in the gap between two dielectrics is decreased, the electric field strength on the surfaces of the electrodes may increase. Increasing the electric field strength produces larger amounts of streamers which results in improved rotational and vibrational excitation, electron avalanche, dissociation, and ionization processes.

Plasma Transformer & Inverter

To provide energy to the probes 2a to 2n the plasma transformers 3a to 3n and inverter 4 (sometimes collectively referred to as "generator") may comprise structure as described in U.S. application Ser. No. 15/926,965 (see FIG. 6 of that application) assigned to the same assignee as the present application which is incorporated by reference herein as if set forth in full herein. One exemplary structure may comprise a 10 kW a unipolar/bipolar device with an automatic operating pulse density modulation (PDM) frequency range from 1 kHz to 30 kHz. Further, the plasma generator may be operable to tune an output frequency to maximize the peak voltage and maintain the breakdown voltage in the plasma discharges it generates in the water. The plasma generator may be connected to a 208 VAC 3-phase electrical utility source via a 3-phase electrical power cable and operable to produce signals having a 30 kV output voltage and a 0.167 A current, for example, in order to supply each of the a plasma probes 2a to 2n with the energy required to allow a probe 2a to 2n to produce high-energy electric fields (electrohydraulic discharges) in water. The plasma generator may be configured such that it is installed in an electronic housing unit along with plasma probes 2a to 2n, for example, or may be installed in separate housing with the necessary connections to probes 2a to 2n. It should be understood that by configuring the generator in the housing, the generator may be connected to probes 2a to 2n using short (dimension-wise) connections. This configuration aids in insuring that those users of the system 1 are not exposed to the high voltages produced by the plasma generator and makes the supply of energy to the probe more efficient (i.e., the shorter the physical connection, the less energy is lost through the connecting cables, wires, etc.).

In an embodiment, as described further below, the plasma generator may include the following sub-circuitries, circuitry, and/or modules: AC to DC bus-bar voltage/current circuitry, IGBT (Insulated Gate Bipolar Transistor) module, microcontroller (which may be separate from, or the same as controller 6 in FIG. 1), status LEDs, pulse width modulator/pulse density modulator, gate driver opto-couplers, fault detection circuit, AC-to-DC low voltage converters, and thermal management circuitry.

AC to DC Bus-Bar Voltage/Current Circuitry

In an embodiment, an AC to DC power supply module circuit may be operable and configured to accept 3-phase AC power at an input receptacle. An AC power surge filter module with a metal oxide varistor (MOV) may be connected in parallel between the 3-phase 208 VAC power line conductors and function to protect the plasma generator from electric power utility surge, voltage dips, variations, and brownout conditions. The AC power surge filter module may further contain an EMI filter that functions to reduce conducted emissions produced by the plasma generator on the 3-phase AC power line conductors. Three-phase 208 VAC AC voltage via lines may be stepped down from power utilities by the transformers 3a to 3n and rectified by a 3-phase AC bridge rectifier to produce a 240V peak DC bus voltage and a 41.7 A peak DC bus current. The DC bus bar voltage may be stabilized by Zener diode and filtered by inductor and capacitor. The DC bus voltage may be used to power an IGBT module. The plasma generator(s) may contain current limiters to limit inrush current during the start-up and normal operating conditions of the plasma generator(s).

IGBT (Insulated Gate Bipolar Transistor) Module

In an embodiment, an IGBT module may comprise a full-bridge IGBT circuit consisting of two upper and two lower Insulated Gate Bipolar Transistors (IGBTs) switches connected in a cascade arrangement. The IGBT module may have 5-terminal circuits which include a DC bus voltage input j, two mid-points between the four switches and, a ground return, two low-side gate drives input and two high-side gate drives input. The diagonal pairs of IGBT switches may conduct alternately, thus, achieving current reversal in the transformer's primary side. The output of the IGBT module may directly connect to the input of the pulse transformer.

Low Voltage AC-to-DC Circuitry

The AC-to-DC circuit may comprise a stepdown transformer, an AC to DC rectifier, six DC-to-DC converters necessary to generate +15V/1.5 A; +12/5 A; −12V/5 A; +5V/1.5 A; and −5V/1.5 A; for supplying power to subsystem circuitries of the plasma generator, for example.

Thermal Management Circuitry

In an embodiment, the IGBT module may be mounted on a heat sink that comprises one or more fans to exhaust heat from the IGBT module. A microcontroller may be operable to control (e.g., shut down) electrical power to the plasma generator in order to protect the generator from thermal damage by, for example, sending high-temperature lockout signals to the generator. A 5 kΩ negative coefficient thermistor (temperature sensor) may function as a thermal sensor and may be mounted on a preamplifier and IGBT heat sink. Two comparators in the fan may be operable to monitor the temperature of the temperature sensors. Signals from the comparators may be sent to a microcontroller where the microcontroller (controller 6 or a separate microcontroller) converts the signals to a temperature and compares the temperature to a stored reference. In an embodiment, one or more temperatures for turning the fans on or off (i.e., controlling the fans) may be stored in the microcontroller for the fans to perform their function. In more detail, the first comparator may be operable to send signals that control the operation of the fans by, for example, turning the fans on whenever the temperature at the temperature sensor rises to about 110° F. and turning the fans off when the temperature drops about 5 degrees, for example. Each fan may comprise resistance circuitry (e.g., a resistor) that is operable to generate a signal representative of a small differential in temperature that functions to allow enough heat to be drawn away from the heat sink so that the fans will not stutter on and off as the heat stored in the heat sink core begins to be detected by the sensor mounted on a surface of the heat sink.

Fault Protection Circuitry

Fault protection circuitry may be operable to disable drive signals to the IGBT switches should the output voltage signals at mid points or the load current through the full bridge exceed preset reference values. Resistors respectively may function to measure over protection voltage signals. Resistor may function to determine an over current signal based on a voltage drop across the resistor. A fault protection logic module may consist of two high speed comparators.

In an embodiment, additional digital circuitry may be included such as monitoring status LED circuits that function to monitor the following: system faults, IGBT faults, high side temperature, hot load, power (high and low), locked system, load fault and inverter status (on or off).

Transformers

In an embodiment, each of the transformers $3a$ to $3n$ may comprise a pulse transformer. Further each transformer $3a$ to $3n$ may comprise a step-up transformer that functions to produce 5 kVA of power with an input voltage of 240 V, an input current of 41.7 A, an output voltage of 30 kV, and an output current of 0.33 A, for example. Each transformer $3a$ to $3n$ may comprise an IGBT switch that may function to turn the power to each transformer on and off at 1 kHz to 30 kHz operating frequency, for example, and a PDM duration provided by the PWM/PDM circuitry in order to deliver constant power from the plasma generator via output port to a plasma probe $2a$ to $2n$. Each transformer may additionally be comprised of a Tesla tuning coil that may function to control the resonant frequency range of a plasma probe $2a$ to $2n$ so that a dielectric barrier discharge resonance may be achieved that, in turn, maximizes the peak-to-peak output voltage of the plasma generator to achieve a voltage required to generate plasma discharges in the water. Each transformer $3a$ to $3n$ may operate in a unipolar or bipolar pulse mode. In the bipolar pulse mode, a transformer may generate magnetic field lines from its core that alternate between positive and negative values (e.g., magnetic field lines cross from positive values, to zero, to negative values). Such an operation reduces the transformer's heat and core losses. In the unipolar mode, a transformer's internal bias coil that is connected to a fixed direct current may function to create biasing magnetic field lines, which forces the magnetic field lines to cross zero to reduce core losses and heat.

Voltage And Frequency Control of Plasma Probes

Figure 5:
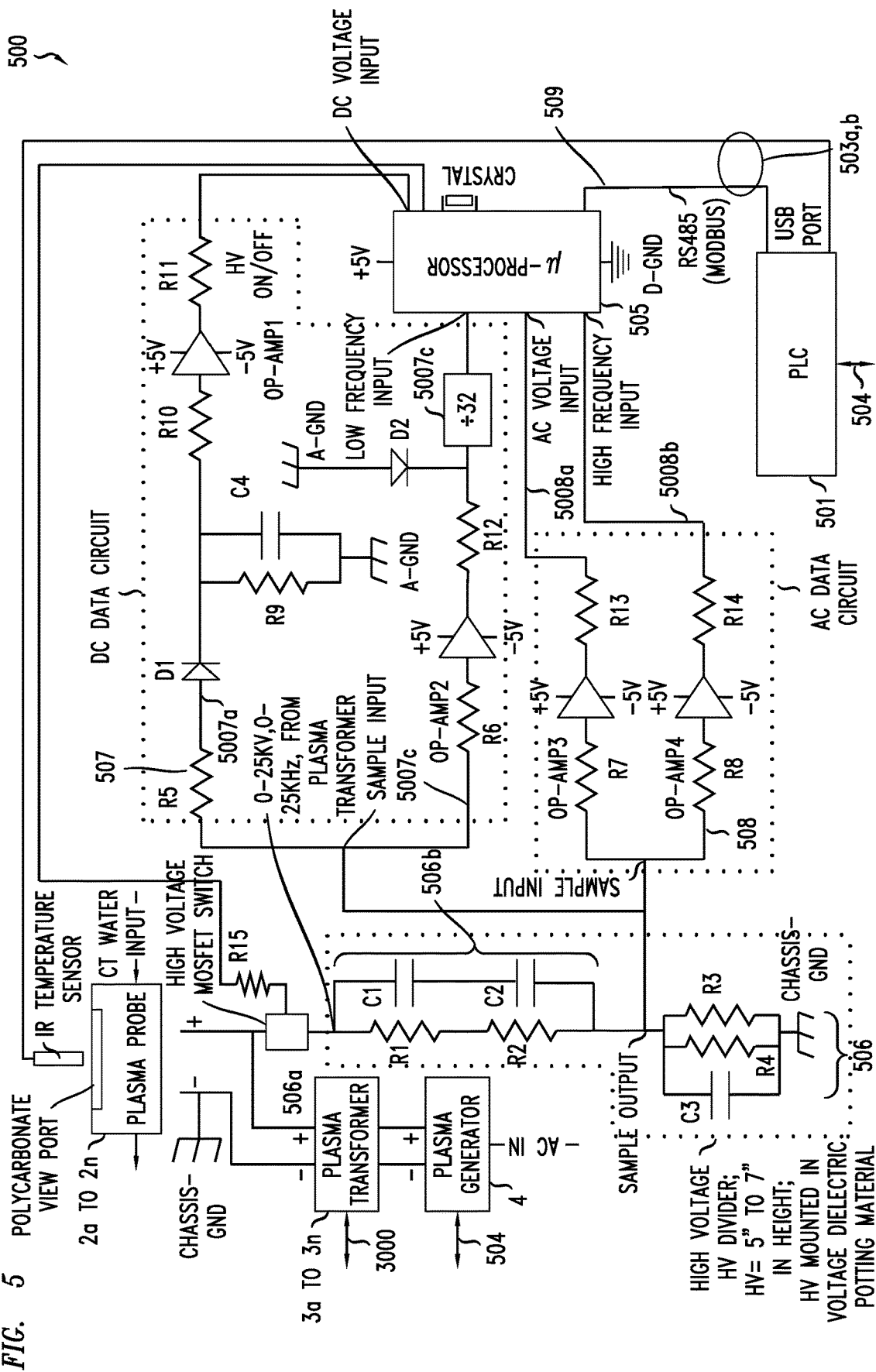
FIG. 5 depicts a voltage and frequency control section according to an embodiment of the invention.

In an embodiment, the voltage and frequency being applied to the plasma probes $2a$ to $2n$ may be controlled by the controller 6 or a separate PLC. Referring to FIG. 5 there is depicted a voltage and frequency control section 500 that functions to control the voltage and frequency being applied to the plasma probes $2a$ to $2n$, to, among other things, insure that the thermal stresses (e.g., temperatures) generated as the probes $2a$ to $2n$ operate do not result in a degradation of the structure of the probes $2a$ to $2n$. For example, if temperatures within a probe $2a$ to $2n$ exceed a maximum, threshold temperature (e.g., approaching 1000° F.) for too long a period of time or sudden spikes in temperature occur the internal components and the material composition of such components of a probe $2a$ to $2n$ (e.g., glues holding elements of a probe $2a$ to $2n$ together) may degrade. Such a degradation may result in a probe becoming less efficient or completely failing, for example.

Further, the voltage and frequency of the signals generated by a plasma generator to each of the probes $2a$ to $2n$ may be controlled such that each of the probes operates at a frequency that provides a maximum peak-to-peak voltage at the lowest amount of power (i.e., a resonance frequency). In an embodiment, the PLC 501 (or controller 6) may be operable to control (e.g., adjust if necessary) the operating frequency and duty cycle of each probes' pulse width modulator/pulse density (PWM/PDM) circuitry to match a resonant frequency for each plasma probe $2a$ to $2n$.

In more detail, the conductivity of the water flowing through probes $2a$ to $2n$ may change over time. Realizing this, in an embodiment the PLC 501 (or controller 6) and components of the PWM/PDM circuitry may be operable to adjust the "on" and "off" times (duty cycle) to make sure a resonant frequency is maintained.

In an embodiment PLC 501 (or alternatively, PLC 5 in FIG. 1) may be operable to adjust the operating frequency of, and voltage output from, the plasma inverter 4 and/or transformers $3a$ to $3n$ when necessary by sending control signals to such elements via control bus 504 (e.g., RS-232) based on inputs 503*a,b* the PLC receives from processor 505 (e.g., microprocessor). By controlling the voltage output by the inverter/transformers and the operating frequency the voltage and operating frequency of the signals applied to the probes $2a$ to $2n$ can, thereafter, be similarly controlled.

For ease of explanation section 500 may be separated into one or more subsystems. For example, section 500 may comprise the aforementioned processor 505, PLC 501 along with a voltage conversion section 506, DC signal adjustment subsystem 507, and AC signal adjustment subsystem 508. That said, it should be understood that section 500 may be separated into fewer or more subsystems.

In an embodiment, prior to controlling (e.g., adjusting if necessary) the voltage or frequency being applied to the probes $2a$ to $2n$ by the generator (i.e., inverter 4 and transformers $3a$ to $3n$) the input voltage, VIN may be reduced using the voltage conversion subsystem 506. For example, if the voltage being supplied by an external electric generation plant (e.g., an electric utility) is 20,000 Volts (V) then 20,000V may be used by the plasma generator and applied to probes $2a$ to $2n$ to generate plasma energy. However, in general, the electronics needed to control a 20,000V signal at such a high voltage may take up a large amount of space (volume) and be very costly. Thus, in an embodiment, to effectively detect changes in the voltage or frequency of such a signal—changes that might adversely affect the operation of the probes $2a$ to $2n$—the voltage may first be substantially reduced by the voltage conversion subsystem 506.

To do so section 506 may comprise a high voltage switch 506*a* (e.g., a 0 to 25 kilovolts (kV), 0 to 25 kHz MOSFET switch) that may be connected to the positive (+) side of each of the plasma transformers 3a to 3n and may be operable to continuously or periodically connect the high voltage signal from the positive side of the transformers 3a to 3n (e.g., the 20,000 kV signal) to a multi-stage, high voltage divider section 506b. In an embodiment, the switch 506a may receive signals from the controller 6 (see FIG. 1), for example, via connection 506c that determines how often the switch 506a may connect the high voltage signal to the multi-stage, high voltage divider section 506b.

Section 506b may comprise, for example, a plurality of resistive structures or means (R) and frequency responsive capacitive structures or means (C) stages where each combined RC stage comprises a resistive structure in parallel with a capacitive structure and each stage reduces the value of the voltage from a higher voltage to a lower voltage. It should be understood that while FIG. 5 depicts the use of two RC stages this is merely exemplary. In actuality, more stages (e.g., 5 or 6 stages) may be necessary to convert the value of the high voltage signal to a substantially lower value that can be fed to the DC signal adjustment subsystem 507 and AC signal adjustment subsystem 508 in order to control the voltage and frequency. In one embodiment the value of the voltage output, $V_{OUT}$, by the multi-stage, high voltage divider section 506b may be 5V though, again, this is merely exemplary.

Figure 6:
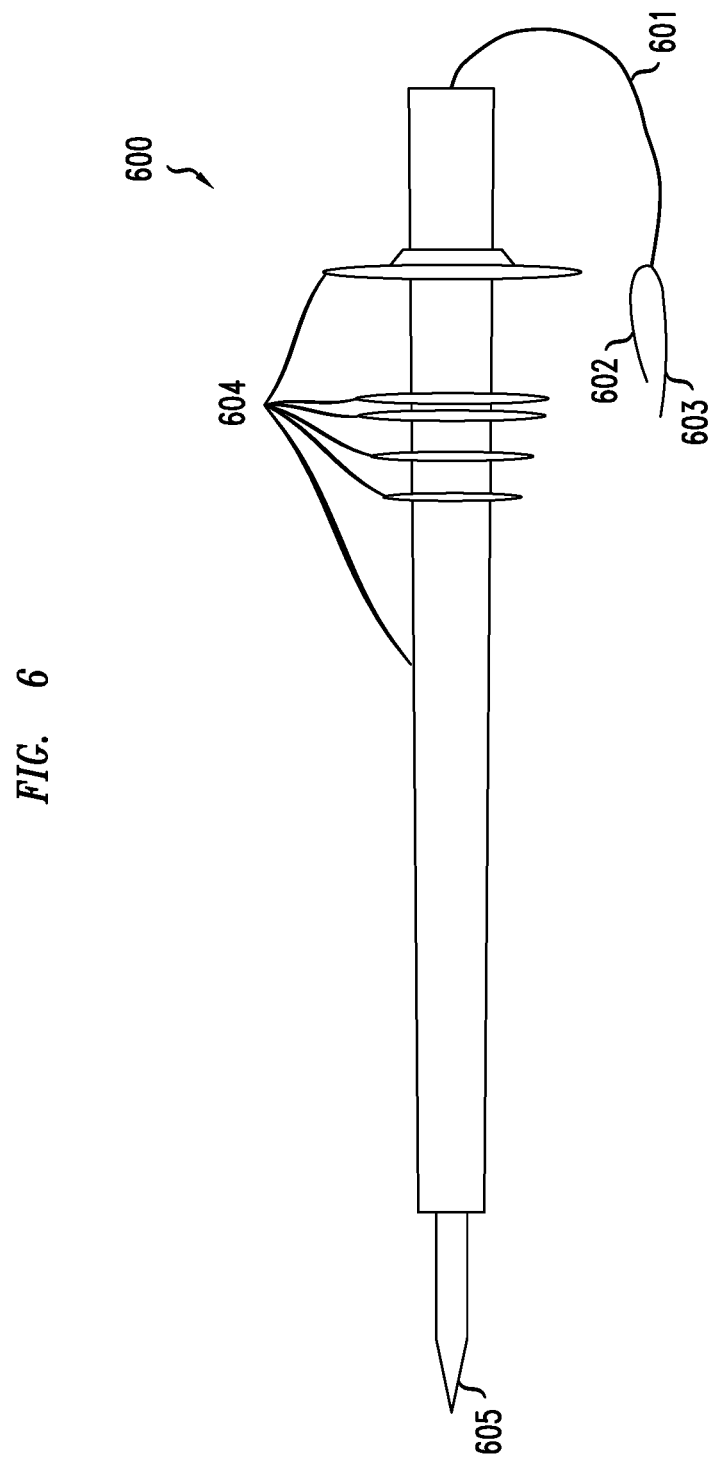
FIG. 6 depicts an exemplary structure that may function as a multi-stage, high voltage divider according to an embodiment of the invention.

FIG. 6 depicts an exemplary structural element 600 that may function as a multi-stage, high voltage divider section 506b shown in FIG. 5. Element 600 may comprise a dielectric housing material 604 (rated at 17 KV/mm, for example), high voltage resistive structures and capacitive structures. The element 600 may further use a high voltage epoxy material to increase the dielectric barrier of resistive structures or means R1, R2, R3, R4, R15, and capacitive structures or means C1, C2, C3, and high voltage mosfet switch 506a shown in FIG. 5 thereby creating a high voltage isolation 606 between the various components within the housing. Further, a brass terminal tip 605 is connected to the high voltage plasma probe positive terminal.

Continuing, the lowered voltage $V_{OUT}$ may be provided via electrical conductors to DC signal adjustment subsystem 507 and AC signal adjustment subsystem 508. It should be understood that while both a DC signal adjustment subsystem 507 and AC signal adjustment subsystem 508 are depicted in FIG. 5, in alternative embodiments only one may be included. For example, just a DC signal adjustment subsystem 507 may be used when, for example, the frequency applied to the probes 2a to 2n is controlled via alternative means. It should be understood that while either subsystem 507,508 may be used to adjust an AC signal the microcontroller 505 must be operable to sample an AC signal at twice the frequency of the signal according to an accepted Nyquist theorem computation.

The DC signal adjustment subsystem 507 may receive the DC component of the signal at the lowered voltage value and separate the signal into two electrical pathways or branches 5007a,5007b. In an embodiment, the electrical elements comprising branch 5007a may be operable to modify, if necessary, the value of the amplitude (i.e., level) of the DC component of the signal while branch 5007b may be operable to modify, if necessary, the frequency value of the DC component such that both the amplitude and frequency may be detected by, for example, the processor 505.

It should be noted that branch 5007b is depicted as including a divide by 32 electronic element 5007c, and this is merely exemplary. In more detail, the DC frequency component of the signal must be detected by the processor 505. In one embodiment the processor 505 may comprise structure that can detect a maximum frequency of 1 kHz. Thus, if the lowered voltage signal comprises a 25 kHz signal it must be reduced to a signal at 1 kHz or below. This may be accomplished by the divide by 32 element 5007c that is operable to divide the 25 kHz signal by 32, for example. It should be noted that the divide by 32 element 5007c may be replaced by an element that provides an appropriate frequency to the processor 505. For example, if the processor 505 comprises a structure that can detect a maximum frequency of 2 kHz then the divide by 32 element 5007c may be replaced with a divide by 16 element for the same 25 kHz signal. Conversely, if the processor 505 comprises a structure that can detect a maximum frequency of 0.50 kHz then the divide by 32 element 5007c may be replaced with a divide by 64 element for the same 25 kHz signal.

In sum, when a processor is to be used to detect, and assist in the control of, the DC voltage the electrical elements comprising branch 5007a may be operable to modify, if necessary, the value of the amplitude (i.e., level) of the DC component such that amplitude may be detected by such a processor and when a processor is to be used to detect, and assist in the control of, the DC frequency the electrical components comprising branch 5007b may be operable to modify, if necessary, the frequency value of the DC component such that frequency may be detected by such a processor.

Turning now to the AC adjustment subsystem 508 such a subsystem may receive the AC component of the signal at the lowered voltage value and separate the signal into two electrical pathways or branches 5008a,5008b. In an embodiment, the electrical elements comprising branch 5008a may be operable to modify, if necessary, the value of the amplitude (i.e., level) of the AC component of the signal while the electrical elements comprising branch 5008b may be operable to modify, if necessary, the frequency value of the AC component such that both the amplitude and frequency may be detected by the processor 505. In embodiments each branch may comprise so-called buffering circuitry to modify the 25 kHZ low voltage AC signal such that the processor 505 can detect, and assist in the control of, the AC voltage and frequency.

As shown in FIG. 5, the processor 505 may be operable to receive the so modified DC and AC voltage and frequency signals from branches 5007a,b and 5008a,b and then detect the voltage and frequency values (levels) of the DC and AC components of the signal using its internal circuitry and/or stored, specialized instructions stored in onboard memory or in a separate memory device (not shown). The processor 505 may further be operable to process such detected values for each probe 2a to 2n and determine the power being consumed for each probe 2a to 2n and determine whether or not a given set of detected voltage and frequency values for each probe 2a to 2n correspond to a frequency and a maximum peak-to-peak voltage at a lowest amount of power—i.e., a resonance frequency—by, for example, comparing the detected voltage and frequency values and determined power to stored reference values for each parameter and for each probe 2a to 2n.

In embodiments, the processor 505 may be operable to send electrical signals to the PLC 501 via connection or electrical pathway 509 to instruct the PLC 501 to adjust the voltage and/or frequency of the signal being generated by the plasma generator and applied to the probes 2a to 2n if the processor 505 determines that the detected voltage or frequency or power does not correspond to a stored reference value (or within a +/−tolerance, e.g., +/−10% of a stored reference value).

PLC 501 may be operable to receive such instructions and, thereafter, send signals to each of the transformers 3a to 3n via electrical connection(s) or pathway(s) 504 to adjust the PWM/PDM circuitry within each transformer 3a to 3n in order to adjust each PWM.PDM's "on" and "off" times (duty cycle) to insure that the signal being applied to each probe 2a to 2n is maintained at a resonance frequency.

Electrolytic Ionization Section

Referring back to FIG. 1, as mentioned previously the exemplary electrolytic ionization section may comprise one or more electrodes 80a to 80n. In embodiments, water may flow between each electrode 80a to 80n. Each electrode may be an anode or a cathode, and may be composed of one or more of the following, non-limiting exemplary materials: arsenic, antimony, cadmium, chromium, copper, mercury, nickel, lead, silver, and zinc, for example.

As previously indicated, elements of the electrolytic ionization section may be controlled by controller 6 or a separate microcontroller. The controller 6 may be operable to control the polarity of the electrodes 80a to 80n. For example, the controller 6 may be operable to send control signals to switches or relays known in the art (not shown in figure) to reverse or change the polarity of electrodes 80a to 80n from positive to negative, and negative to positive. For example, upon receiving such control signals the relays may be operable to connect a negative or positive voltage to a respective electrode 80a to 80n. In accordance with principles of the invention, by alternating the polarity of the electrodes 80a to 80n the leaching of ions from the electrodes may be controlled.

In more detail, the polarity of each electrode 80a to 80n determines whether ions will leach from, or to, an electrode. For example, when the polarity is positive one electrode, such as electrode 80a, and negative at another electrode, such as electrode 80b, then ions may leach from electrode 80a. Conversely, when the polarity of electrode 80a is negative and the polarity of electrode 80b is positive, ions will leach from electrode 80b. The ability to control the polarity of the electrodes 80a,b, therefore, also allows the controller 6 to effectively control the leaching of ions (e.g., metal ions) from one electrode to another via, and to, the water. Relatedly, the ability to control the leaching of ions from the electrodes 80a to 80n further allows the controller 6 to minimize the build-up of ionic material on the cathodic electrode (i.e., the electrode that ions flow to after having leached from an opposite electrode). Said another way, to avoid too much build-up of ionic material on one electrode, the controller 6 may be operable to change the polarity of the electrodes 80a to 80n to reverse their polarity, and, therefore reverse the flow of ionic material (and related build-up) from one electrode to another.

In more detail, the transfer of material may be controlled by controlling the voltage applied to the electrodes 80a to 80n. For example, for a given amount of energy within a given voltage (i.e., a DC electric charge), the mass (amount) of the material leached from an electrode is directly proportional to the equivalent weight of the electrode's material and can be computed using Faraday's second law of electrolysis:

$$m = \left(\frac{Q}{F}\right)\left(\frac{M}{z}\right) \quad (2)$$

where (m) is the mass of the material liberated at an electrode, (Q) is the total electric charge passed through the material, (F) is Faraday's constant, (M) is the molar mass of the material, and (z) is the valency number of ions of the material. The following exemplary chemical reactions represent the release of biocidal ions from an electrode composed of an alloy of both silver and copper through electrolytic ionization (described above):

$$Cu \rightarrow Cu^{2+} + 2e^- \quad (3)$$

$$2Ag \rightarrow 2Ag^+ + 2e^- \quad (4)$$

In an embodiment, exemplary silver and copper alloy-based electrodes 80a to 80n may be composed of a variable amount of silver and copper. For example, the range of silver-to-copper may be a minimum of 60:40 silver to copper while a maximum may be 80:20. As material (cupric and silver ions) are released from an electrode (i.e., leached), their release causes the electrode to be gradually consumed. Further, it is believed that once the cation ions (cations for short) have been released into the water, the cations react with negatively charged portions of bacteria in the water (e.g., cell walls of the bacteria) to form electrostatic bonds. The energy (force) associated with the formation of the bonds is believed to lead to the distortion of the cell wall of the bacteria (i.e., the walls become more permeable and eventually breakdown, causing cell lysis and cell death). For example, a positively charged cation will attract a negatively charged ion that comprises an integral portion of the cell wall. As a result of the attractive force, the negatively charged ion will feel a force that is pulling it away from the surrounding cell wall, leading to a weakness and even breakdown of the cell wall. In an embodiment, this process may be simultaneously felt by a plurality of negatively charged ions making up the cell wall, leading to an overall weakness and breakdown of the cell wall. Once the cell wall is effectively weakened or broken down, the bacteria becomes substantially weakened or even destroyed.

The system 1 may further include flowmeters 11a to 11n. In an embodiment, the flowmeters 11a to 11n may be configured or positioned to determine the rate that the water flows into a chamber 7 surrounding the electrodes 80a to n. In an embodiment, the determined flow rate may be sent to the controller 6 via a wired or wireless connection in the form of one or more electronic signals. Thereafter, the controller 6 may be operable to compute both an instantaneous and averaged concentration of dissolved ions based on the received signals, and, thereafter, may be operable to control the power up or down (voltage) that a DC power supply (not shown in figures) is supplying to the electrodes 80a to 80n. In an embodiment, a higher power may result in a greater leaching of metal ions into the water which, in turn, has the effect of increasing the "bombardment" of metal ions onto the chemical bonds that hold compounds in the water together. Such bombardment weakens and may even destroy the chemical bonds making it difficult for the scale forming minerals to form hard, needle-like crystalline (calcite) scale. The reduction and/or prevention of scale formation is believed to also reduce the opportunity for bacteria to grow on such scale.

Having presented the structure and function of some embodiments of the invention, we now turn to a discussion of the operation of such embodiments. In particular we now discuss how embodiments of the invention (e.g., plasma probes 2a to 2n) form plasma energy discharges in water or water vapor that may be used to treat harmful biological contaminants, among other functions.

During discharge, water in between two electrodes of a plasma probe 2a to 2n may instantly evaporate and undergo thermal breakdown upon application of plasma energy from the electrodes. The application of the plasma energy causes a discharge to form between pairs of electrodes due to the large amount of (heat) energy from the electrical current of the applied fields. It should be understood that if the amount of heat energy delivered to the water is lower than a threshold, for the most part, only electrolysis will occur. Accordingly, in embodiments of the invention a plasma probe 2a to 2n may be operable to generate fields that exceed such a threshold of the water in order to form streamers. In embodiments, the application of the plasma energy to the water functions to produce a plurality of streamers in the water. The streamers in turn function to initiate the energizing of electrons and the creation of, or buildup of, an electrical charge (i.e., space charge accumulation) in the water. In embodiments, this produces reactive (ionic and excited atomic) and molecular species in the water. These reactive and molecular species are characterized and created by electron avalanche, rotational and gravitational excitation, dissociation, and ionization processes with energies up to 20 electron Volt (eV).

Specifically, rotational and vibrational excitation of reactive and molecular species in water may typically occur below a 1 eV energy threshold while electron avalanche occurs between a 5 eV to 20 eV energy threshold and produces various charged particles (electrons, positive ions, negative ions, complex ions, etc.). Disassociation of reactive and molecular species in water may occur in the energy band between 8 eV and 9 eV, while ionization of the water may occur around a threshold of approximately 13-14 eV.

In embodiments, determining the required applied voltage needed to produce streamers in water involves an understanding of the thermal breakdown instability, $\Omega$, of the water due to joule heating. The thermal breakdown instability can be expressed as $$\Omega = \left(\frac{\sigma_0 E^2}{\rho C_p T_0}\right)\frac{E_a}{RT_0} - D\frac{k}{R_0^2} \tag{5}$$

where ($R_0$) is the radius of the breakdown channel, (D) is the thermal diffusivity of water (1.5e-7) m$^2$/s, ($C_p$) is the specific heat constant of water (4179 K/kg*K), and (k) is the thermal conductivity of water (0.6 W/mK). The first term represents the heating element, where the numerator represents heat energy and the denominator represents heat stored in the water. In this first term, the value, $E_a/RT_0$, represents the ratio of the activation energy, $E_a$, to the temperature. The second term, $$D\frac{k}{R_0^2},$$

represents the ratio of thermal diffusivity to the square characteristic length of the radius of the breakdown channel for radial heat conduction. Typically, when the thermal breakdown instability is greater than 0, thermal explosion in water may occur, which in turn creates discharges in the water. Using that phenomenon, the equation above can be reconstructed as:

$$\left(\frac{\sigma_0 E^2}{\rho C_p T_0}\right)\frac{E_a}{RT_0} \geq D\frac{k}{R_0^2} \tag{6}$$

In the generation of different reactive and molecular species, there are instances where full discharges will occur. When that is the case, the following equations (e.g., Equation 8) may be used to calculate the breakdown voltage of the channel. In more detail, the breakdown voltage of water can be determined from the product of the electric field strength (E) of an applied electrical field, and the distance (L) between two electrodes, we introduce a geometric factor, $G=L/R_0$, into Equation 6. Thus, Equation 6 can be rewritten as:

$$\left(\frac{\sigma V^2}{\rho C_p T_0}\right)\frac{E_a}{RT_0} \geq DkG^2 \tag{7}$$

From this equation the breakdown voltage, V, can be determined using $$V \geq \sqrt{\frac{kRT_0^2}{\sigma_0 E_a}}\, G \tag{8}$$

In an embodiment, if the total gap distance (i.e., spacing) between electrodes in each slot of an exemplary probe 2a to 2n may be 4 mm, for example, and the radius of a streamer is typically on the order of 4 μm, an exemplary breakdown voltage in water required to form a full discharge may be estimated to be:

$$V \geq \sqrt{\frac{kRT_0^2}{\sigma_0 E_a}}\, G = \tag{9}$$

$$\sqrt{\frac{0.613 * 461.5 * (300)^2}{0.1 * 700,000}}\, G \cong 28.4 * \left(\frac{4000}{4}\right) \cong 28{,}400\ V$$

$$V \geq 28{,}400\ V$$

In sum, an exemplary voltage of at least 28,400 V between electrodes of a plasma probe 2a to 2n would be needed to breakdown water at 300 K with a gap of 4 mm to create a full plasma discharge. It should be understood that the discharge voltage increases with an increase in gap distance, and vice-versa.

In embodiments, as the conductivity of the water increases, it is expected that the minimum breakdown voltage would decrease. In yet another embodiment, an exemplary voltage of at least 18,000 V between electrodes of a plasma probe 2a to 2n would be needed to breakdown water at 300 K with a gap of 3 mm to create a full plasma discharge.

Rotational and vibrational excitation, electron avalanche, dissociation, and ionization processes that occur in the water due to the generation of streamers may further initiate chemical reactions that result in the formation, or creation, of hydroxyl radicals (OH.), hydrogen (H$^+$), hydrogen gas (H$_2$), atomic oxygen radicals (O.), hydrogen peroxide (H$_2$O$_2$), hydronium (H$_3$O$^+$), super oxide anion (.O2$^-$), singlet oxygen ($^1O_2$) ions, ozone ($O_3$), hypochlorous acid (HClO), chlorate ($ClO_3^-$), and ultra-violet light.

Having presented a discussion of some exemplary, novel systems and related methods that function to generate novel plasma energy in water or water vapor, we turn to a discussion of some exemplary applications of the so-generated plasma energy. In particular, we present some exemplary electrochemical mechanisms which may be triggered, initiated and completed in water or water vapor upon the application of the novel plasma energy discharges to treat harmful biological contaminants (Biofilm, *Legionella* bacteria, etc.).

Mechanism 1, the Treatment of Biological Contaminants Through Ozone Generation In an embodiment, the plasma probes 2a to 2n may be operable to generate plasma energy discharges (e.g., streamers) in water, and to produce ozone in the water in order to treat biological contaminants in water or water vapor. For example, streamers in the water generated by each probes 2a to 2n produces ozone gas ($O_3$) through the process of electron impact dissociation of molecular oxygen ($O_2$) and molecular nitrogen ($N_2$) of a supplied carrier gas supplied by a gas distribution system (not shown in figures, but see FIG. 4A of the '965 Application referred to above). The gas distribution system may include an air compressor and the carrier gas may be either dry air or ambient air, for example. In an embodiment, upon generation of a streamer the molecular oxygen ($O_2$) gas may react with a dissociated oxygen atom from the carrier gas to form ozone gas. The ozone gas causes reactions that lead to the reduction of biological contaminants in the water and further leads to the dissolution of biologically induced corrosion in the water.

$$O_2 + e^- \rightarrow O. + e^- \tag{10.1}$$

$$O_2 + 2O. \rightarrow O_3 \tag{10.2}$$

Mechanism 2, the Treatment of Biological Contaminants Through the Generation of Hydrogen Peroxide In an embodiment, each of the plasma probes 2a to 2n may be operable to generate plasma energy discharges (e.g., streamers) in the water, and to produce hydrogen peroxide in the water to treat biological contaminants (biofilm, Legionella bacteria, etc.) and biologically induced corrosion. In more detail, each exemplary plasma probe 2a to 2n may be operable to generate streamers in the water. The streamers may produce hydrogen peroxide through electron impacts initiated by the disassociation of vibrational excited molecules, where excited feedwater molecules ($H_2O^*$) decompose (see Equation 11.1 below). The excited water molecules ($H_2O^*$) react with the (non-exited) water molecules ($H_2O$) to produce hydrogen ions ($H^+$), hydroxyl radicals (OH.), and additional water molecules ($H_2O$).

$$H_2O + e^- \rightarrow H_2O^* + e^- \tag{11.1}$$

$$H_2O^* + H_2O \rightarrow H^+ + H_2O + OH. \tag{11.2}$$

$$OH. + H_2O^* \rightarrow H^+ + H_2O_2 \tag{11.3}$$

The reactions represented in equation 11.2 above result in the further propagation of reactions of vibrationally excited molecules (represented by Equation 11.3) to produce hydrogen peroxide $H_2O_2$.

Mechanism 3, the Treatment of Biological Contaminants Through Mixed Oxidants Generation In an embodiment, each exemplary plasma probe 2a to 2n may be operable to generate plasma energy discharges (e.g., streamers) in the water, and to produce chlorine reactive oxidative species in the water to treat harmful biological contaminants in the water. Upon formation of the streamers in the water, chlorine based reactive oxidative species are created through electron impacts initiated by the disassociation of vibrational excited molecules.

In more detail, excited chloride ions ($Cl^-$) present in the water combine to form chlorine (see Equation 12.1 below). Thereafter, excited chloride atoms ($Cl^-$) react with the feedwater 112 molecules ($H_2O$) to produce hypochlorous acid (HClO) and hydrogen ions ($H^+$).

Hypochlorous acid and the hypochlorite anion ($ClO^-$) exist in pH dependent equilibrium (represented by Equation 12.3). Chloride is freed as a result of atomic oxygen radical (O.) releases (see Equations 12.4 and 12.5). Continued charge flow results in a two-step chlorate ($ClO_3^-$) formation (as represented in Equations 12.6 and 12.7).

$$2Cl^- \rightarrow Cl_2 + 2e^- \tag{12.1}$$

$$Cl^- + H_2O \rightarrow HClO + H^+ + e^- \tag{12.2}$$

$$HClO \leftrightarrow ClO^- + H^+ \tag{12.3}$$

$$HClO \rightarrow O. + Cl^- + H^+ \tag{12.4}$$

$$ClO^- \rightarrow O. + Cl^- \tag{12.5}$$

$$2OCl^- \rightarrow ClO_2^- + Cl^- \tag{12.6}$$

$$OCl^- + ClO_2^- \rightarrow ClO_3^- + Cl^- \tag{12.7}$$

Byproducts of the Reduction of Biological Contaminants

As indicated previously, each exemplary plasma probe 2a to 2n may be operable to treat harmful biological contaminants in water or water vapor. In so doing, hydrogen gas may be created as a byproduct. In more detail, streamers in the water may produce hydrogen gas ($H_2$) through electron impacts initiated by the disassociation of vibrational excited molecules, where excited water molecules ($H_2O^*$) decompose (see Equation 138). Accordingly, the exemplary system 1 may include ventilation equipment (not shown) to filter and remove the generated hydrogen gas.

$$2H_2O + 2e^- \rightarrow H_2 + OH^- \tag{13}$$

The present invention also provides the ability to service, monitor or otherwise maintain the system 1, its subsystems and their components. In one embodiment, the controller 6 may be operable to communicate with a testing apparatus 21 (e.g., electronic test set, or a hand-held mobile device that is appropriately programmed with electronic instructions, such as a mobile smartphone, tablet) via wired or wireless (or some combination of the two) connection or channel (collectively "channel") 20 to allow information about the operation of the system 1, its subsystems and components to be communicated to service or maintenance personnel. In response, testing apparatus 21 may be operable to exchange specialized instructions with the controller 6 in order to control the operation of system 1, its subsystems and components and/or otherwise obtain the status of system 1, its subsystems and components via channel 20. The controller 6 may do so via a communications port (not shown in figures) to name just one of many ways in which system 1 may communicate with testing apparatus 21 via channel 20. When testing apparatus 21 comprises a portable or handheld test set, the communications port may comprise a serial port operable to allow for connection of the handheld or otherwise portable test to controller 6 via channel 20 by service or maintenance personnel. Alternatively, when testing apparatus 21 comprises a controller located at remote station (e.g., controller 19), the communications port may comprise modem or other necessary electronics necessary to transmit and receive information to/from such a remote station via channel 18, for example.

In embodiments, the controller 6 and/or remote controller 19 may include an interface (e.g., graphical user interface, "GUI") to permit information about the system 1, its subsystems and components to be viewed or otherwise accessed by service or maintenance personnel.

Referring now to FIGS. 7A to 7H there are depicted illustrative displays generated by a graphical user interface (GUI) 22 that may be part of a test set 21, controller 6 and/or remote controller 19, for example, in accordance with embodiments of the invention.

Figure 7A:
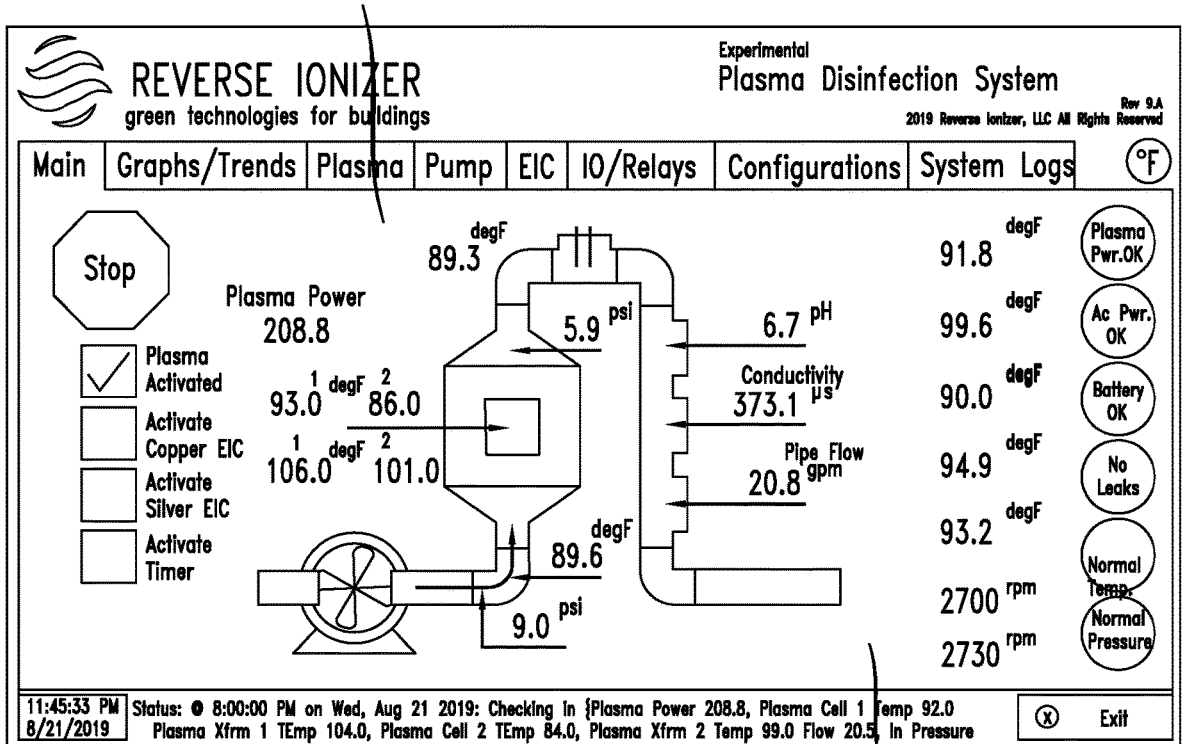
Figure 7B:
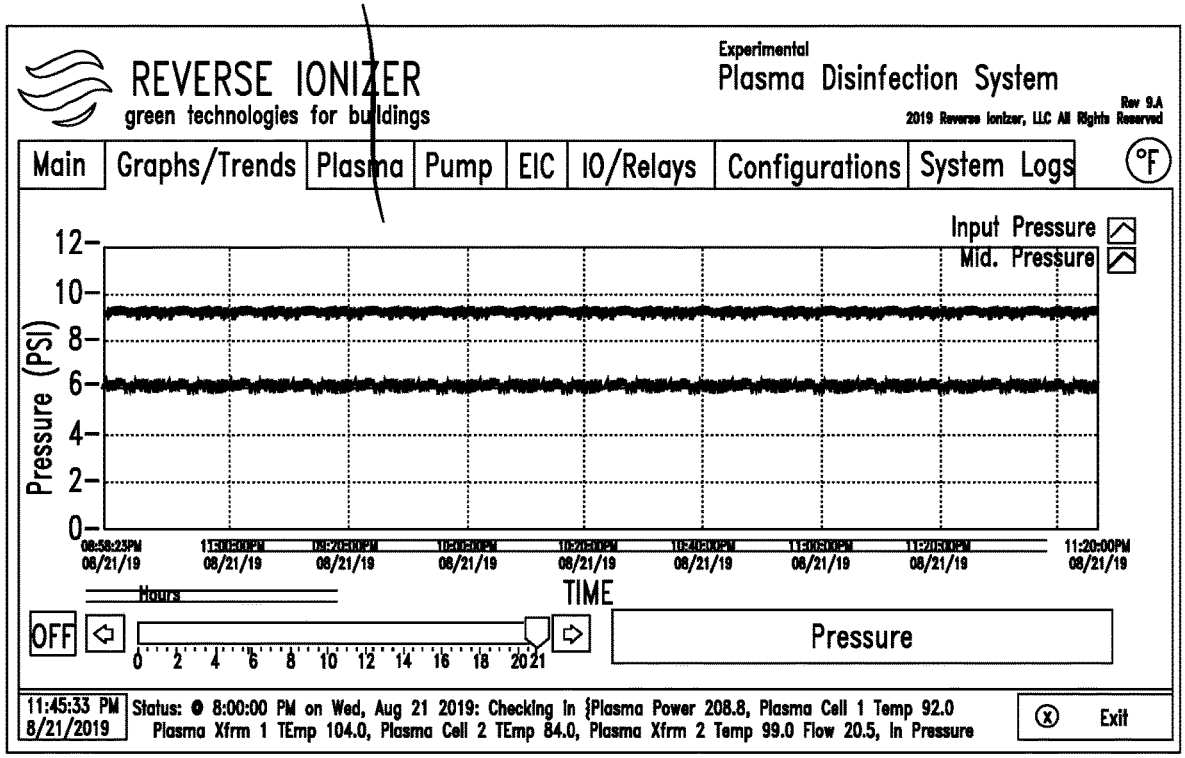

Referring first to FIG. 7A, there is depicted an exemplary display 23a that may be generated by the GUI 22 or one or more similar components capable of displaying data that are a part of test set 21, controller 6 and/or remote controller 19. It should be understood that test set 21, controller 6 and/or remote controller 19 may receive and send (i.e., communicate with) signals and data from, and to, one or more components of the system 1 via a communication channel. For example, signals and data may be received and/or sent from, and to, a probe 2a to 2n, plasma inverter 4, transformers 3a to 3n, electrodes 80a-n, valves 16a-n, 17a,b sensors 12, 13, 14a-n, 15a-n, addressable controllers 307a-n, and meters 11a-n, each appropriately configured to communicate with the test set 21, controller 6 and/or remote controller 19 to name just a few components that may send and and/or receive signals from/to test set 21, controller 6 and/or remote controller 19.

As illustrated by the data depicted in FIGS. 7A to 7H, test set 21, controller 6 and/or remote controller 19 may be operable to receive signals from subsystems and components of system 1 in order to collect data and monitor a plurality of parameters associated with characteristics of water and/or associated with the operation of system 1. The GUI 22 may be operable to display data and parameters associated with characteristics of the water (or another liquid) being treated by system 1. For example, in an embodiment the test set 21, controller 6 and/or remote controller 19 may be operable to compute, and the GUI 22 may be operable to generate a display of the one or more instantaneous system variables, such as pH of the water being treated, temperatures of each of the plasma probes 2a to 2n, conductivity of the water being treated flow rate, pressure levels, power levels of each probe 2a to 2n, fan speeds and various alarm statuses as shown in FIG. 7A. The data associated with the displayed pH, temperatures and conductivities as well as other parameters may be detected or otherwise collected by components described elsewhere herein, such as the valves 16a-n, 17a,b sensors 12, 13, 14a-n, 15a-n, addressable controllers 307a-n, and meters 11a-n to name just a few of the many types of components that may be used to collect the data associated with parameters desired to be displayed. In an embodiment, the GUI 22 may be operable to receive user inputs and generate signals that are sent to various elements of the system 1 in order to control such elements, including, for example, starting and stopping of pumps, and plasma probes, etc.

In addition, the test set 21, controller 6 and/or remote controller 19 may be operable to compute, and GUI 22 may be operable to display, a combination of data parameters as charts or graphs representative of a number of additional measurements (see FIG. 7B), such as historical data and trends of all data stored by test set 21, controller 6 and other controllers. This historical data may include, but is not limited to, temperatures, pressures levels, flows rates, plasma probe power/currents/voltages, and pump frequency/voltage/current.

Figure 7C:
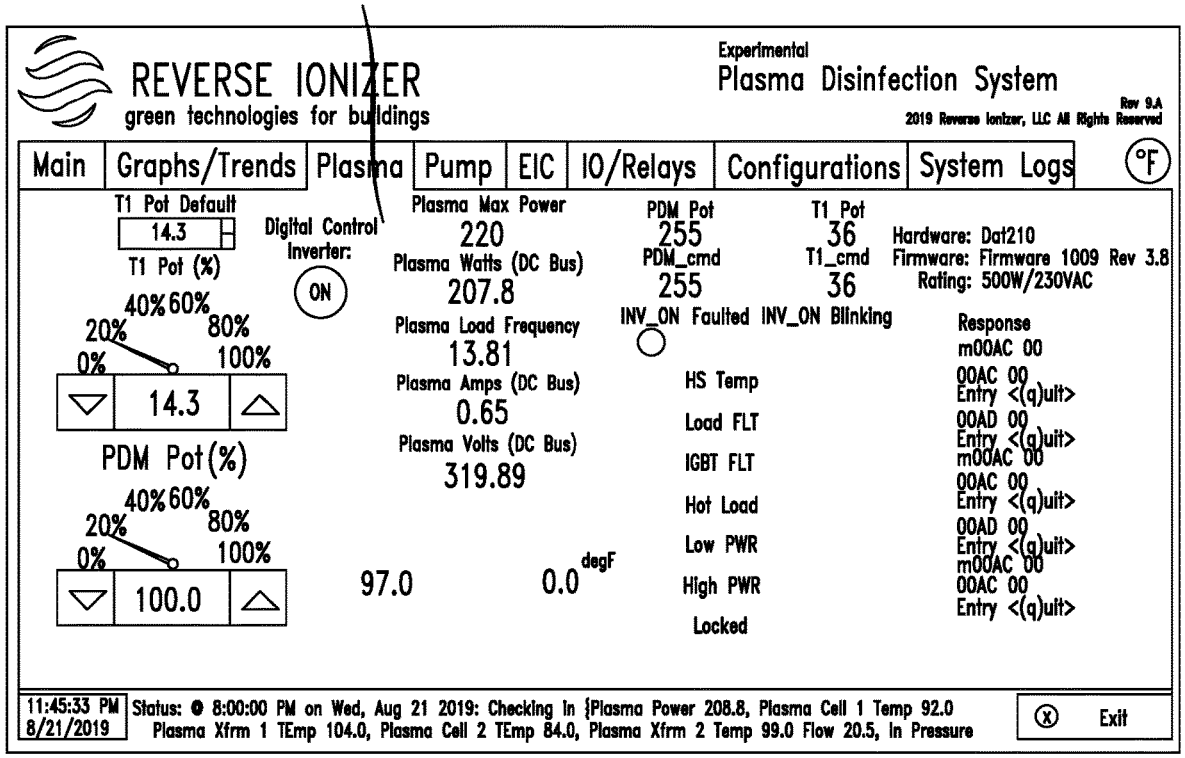

Referring now to FIG. 7C there is depicted information associated with the control and monitoring of the plasma inverter 4 that may be computed by test set 21, controller 6 and/or remote controller 19 and then displayed by GUI 22. In addition, other information associated with the inverter may be displayed, such as inverter version, various alarms, settings and operational statuses.

Figure 7D:
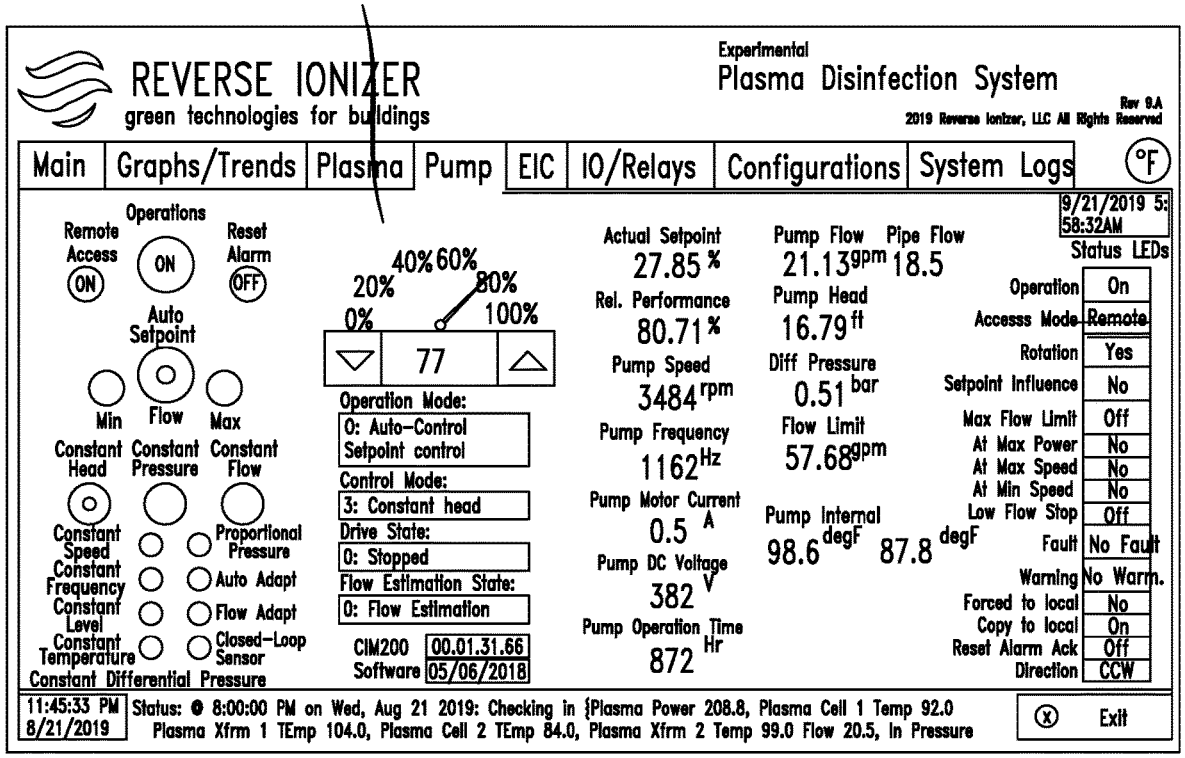

Referring now to FIG. 7D there is depicted a display for assisting the user in controlling and monitoring internal and booster pumps. Data and parameters that may be computed by test set 21, controller 6 and/or remote controller 19 and then displayed by GUI 22 include, for example the speed (RPMs) of internal pump 10 along with additional parameters related to the operation of internal pump 10 and any booster pumps. In addition, GUI 22 may be operable to display a combination of additional data and parameters such as flow rates input into/output from input pipes or output pipes and differential pressures across pipes of system 1.

Figure 7E:
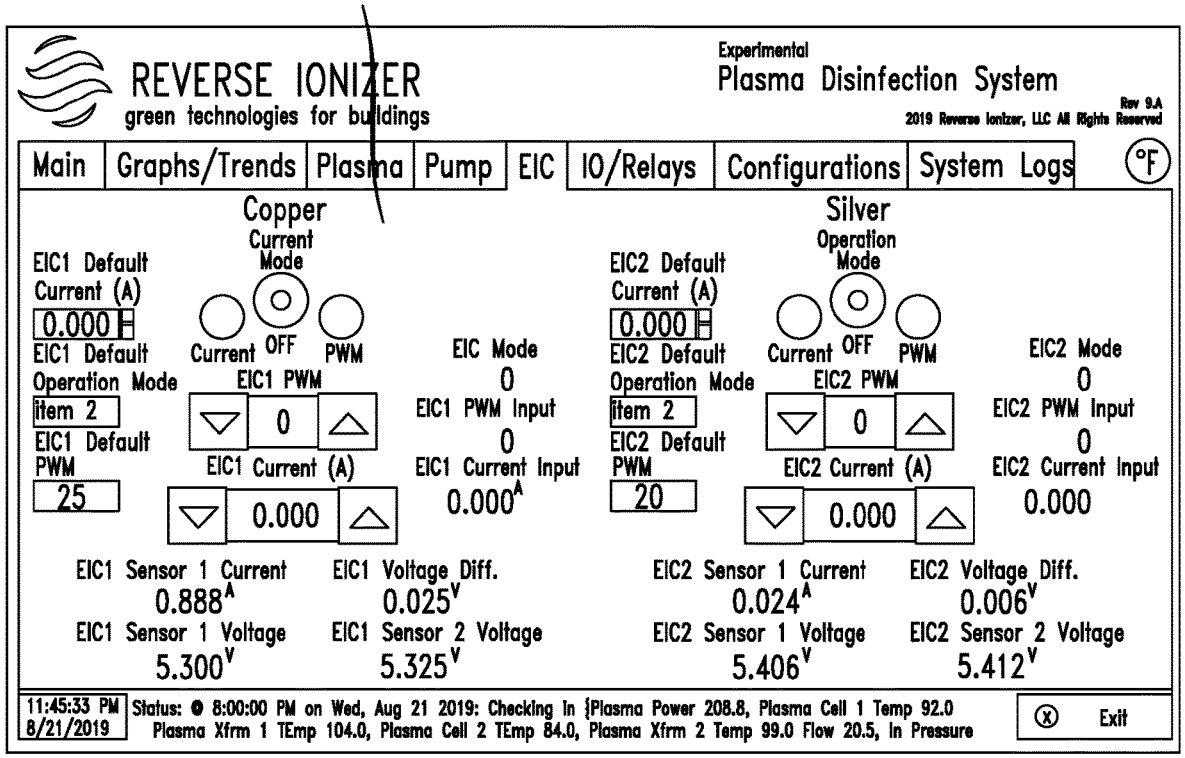
Figure 7F:
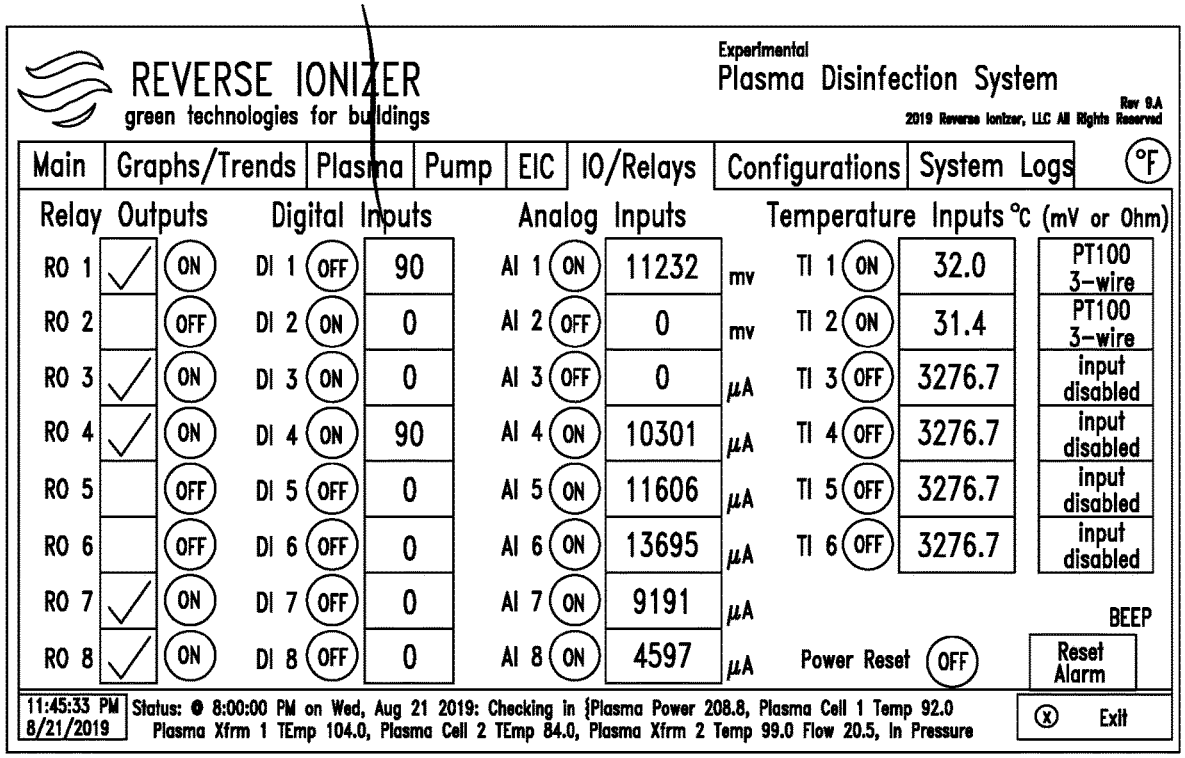

FIG. 7E depicts a display for assisting the user in controlling and monitoring electrodes 80a-n that are a part of the ionization section. Information or parameters that may be computed by test set 21, controller 6 and/or remote controller 19 and then displayed by GUI 22 include, but are not limited to, the current and voltages associated with each electrode 80a-n. In FIG. 7F there is depicted a display for assisting the user in controlling and monitoring input/output relays that provide power to different elements of the system 1. FIG. 7F may also display raw data associated with analog and digital inputs received by a controller, such as controller 6.

Figures 7G, 7H:
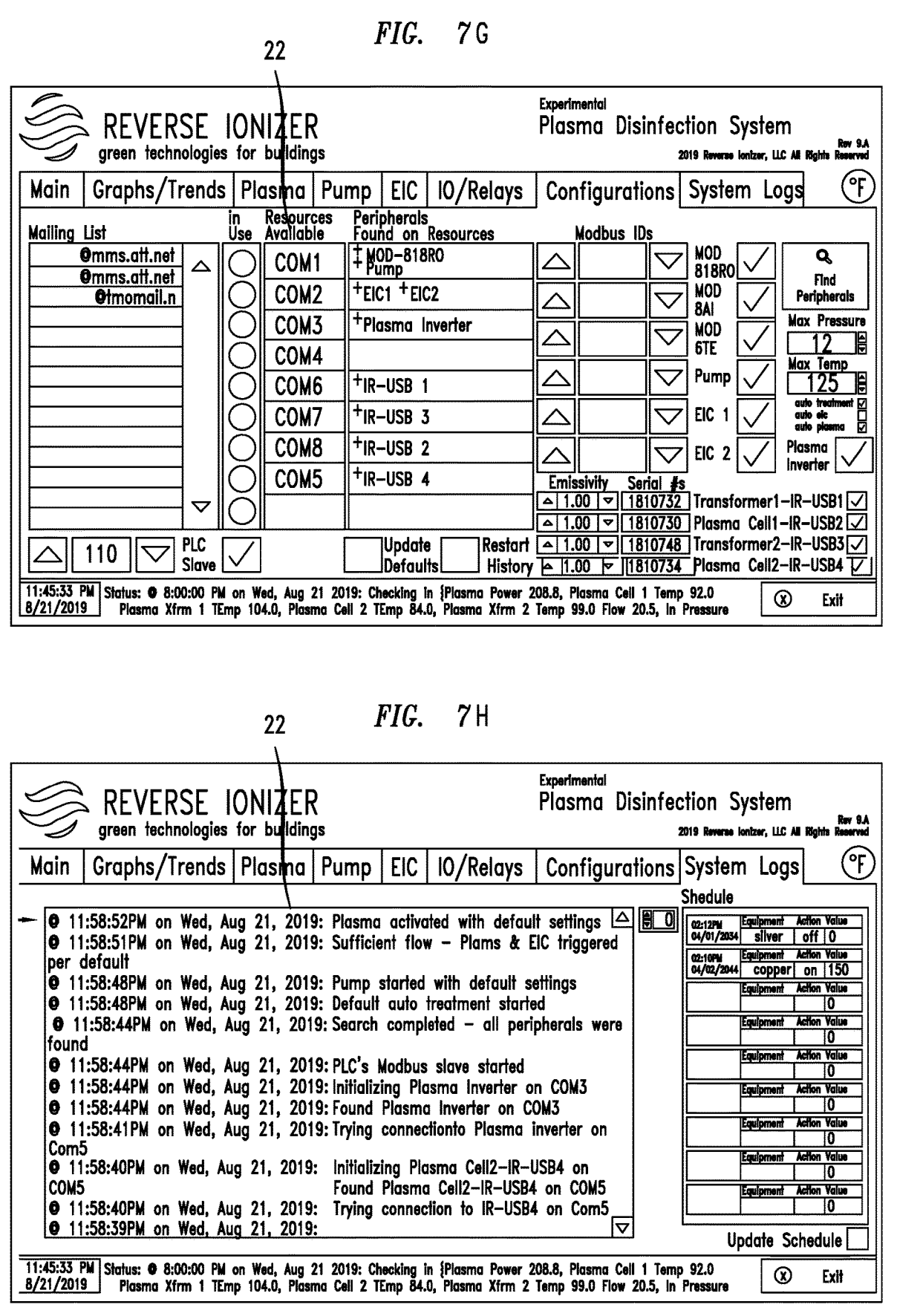

FIG. 7G depicts system configuration information such as the settings and discovery of peripherals that are a part of the system 1. Communication identifiers (e.g., addresses of controllers 307a-n) and port assignments for elements of the system 1 may also be displayed.

Finally, FIG. 7H depicts system log information that may be computed by test set 21, controller 6 and/or remote controller 19 and then displayed by GUI 22. Such information may include, but is not limited to, a list of actions, errors, alarms and statuses with an accompanying timestamp. A list of scheduled actions related to automatic settings and operation of the system 1 may also be displayed.

Because test set 21, controller 6 and/or remote controller 19 and GUI 22 are capable of computing and displaying a wide array of parameters related to system 1 it can also be used to improve the overall efficiency of components of such a system.

In additional embodiments of the invention, the data received, and computations generated, by test set 21, controller 6 and/or remote controller 19 may be stored in an associated memory and used as real-time or historical information to further: (a) compute and generate maintenance schedules for subsystems and components of system 1, (b) compute and estimate times when failures may occur in the future in such subsystems and components, and to (c) identify and isolate failures of subsystems and components in system 1 in real-time to name just a few of the many ways in which such collected data and computations may be used. Upon making such computations, a user of system 1 may be able to more efficiently schedule preventive and/or regularly scheduled maintenance visits by maintenance or service personnel to such a system. That is, instead of scheduling too many or too few maintenance or service visits that result in unnecessary costs or worse, component failures, systems and devices provided by the present invention allow a user to schedule visits in a smarter, more effective manner that may reduce the cost of operating a system and reduce the number of unexpected failures of components making up such a system.

It should be understood that in addition to receiving data related to the characteristics of a liquid being treated and/or the operation of the elements of system 1 the present inventors provide for means and ways to control such characteristics and system 1. In embodiments of the invention, upon receiving data, computing parameters and displaying such data and parameters, such as those depicted in FIGS. 7A to 7H, test set 21, controller 6 and/or remote controller 19 may be operable to transmit or otherwise send signals to elements of system 1 via communication channels in order to control the operation of such elements, which, in turn, may control the characteristics of the liquid being treated. In one embodiment, test set 21, controller 6 and/or remote controller 19 may be operable to generate electrical signals based on the data collected and parameters computed and then send such signals to elements within the system 1 or to PLC 501, other controllers, such as addressable controllers 307a-n, motor controllers or temperature controllers via communication channels in order to control the operation of such components and control the characteristics of the liquid being treated in the system 1. For example, in one embodiment test set 21, controller 6 and/or remote controller 19 may be operable to execute stored instructions in its memory to generate signals associated with data it has received concerning the speed of a pump or fan. Such signals may be sent to a pump or fan directly, or to a motor controller connected to the pump or fan. In either case, such signals, once received by the motor controller, pump or fan may cause a motor that is a part of such a pump or fan to either increase or decrease its speed (RPMs). By changing the speed of a pump or fan the characteristics of a liquid, such as water, may also be affected. For example, the flow rate of water in system 1 may be effected, which in, turn, may affect other characteristics.

In a similar fashion, test set 21, controller 6 and/or remote controller 19 may be operable to send signals to other components of the system 1 via communication channels in order to effect changes to other characteristics of water and/or to affect the efficiency and overall operation of the system 1.

It should be apparent that the foregoing describes only selected embodiments of the invention. Numerous changes and modifications may be made to the embodiments disclosed herein without departing from the general spirit and scope of the invention. For example, though water has been the liquid utilized in the description herein, other suitable liquids may be used. That is, the inventive devices, systems and methods described herein may be used to partially or substantially treat these other liquids as well.

What is claimed is:

1. A system for treating harmful biological contaminants comprising:

one or more plasma probes for treating harmful biological contaminants in water flowing through each probe, where each probe comprises dielectric barrier discharge elements;

backpressure control means for adaptively controlling backpressures exerted on the elements when a backpressure between the elements and a reservoir exceeds a threshold; and an ionization section for further treating the harmful biological contaminants in the water.

2. The system as in claim 1 wherein the backpressure control means comprises a controller for determining whether the backpressure exceeds the threshold based on signals received from one or more sensors.

3. The system as in claim 2 wherein the controller is operable to send signals to an internal pump, first valve or second valve to decrease or increase an amount of water fed to the probes.

4. The system as in claim 1 further comprising isolation means for isolating the probes from differences in flow rate of the water.

5. The system as in claim 4 wherein the isolation means comprises a buffer tank and one or more valves for controlling the flow rate.

6. The system as in claim 4 wherein the isolation means further comprises a water level monitoring sensor for detecting a water level of the buffer tank, wherein the controller further controls a rate at which water should be supplied to, or restricted from flowing to, the buffer tank.

7. The system as in claim 1 wherein the ionization section comprises one or more electrodes for further treating the water.

8. The system as in claim 7 wherein each electrode may comprise one or more of the following materials: arsenic, antimony, cadmium, chromium, copper, mercury, nickel, lead, silver, or zinc.

9. The system as in claim 8 further comprising a controller operable to control a polarity of each the electrodes of the ionization section to control leaching of ions from each of the electrodes.

10. The system as in claim 1 further comprising an electromagnetic interference shielded enclosure configured to surround the probes and prevent electromagnetic signals that are generated by the plasma probes within the enclosure from emanating outside the enclosure.

11. The system as in claim 10 wherein the enclosure comprises a protective splashguard for protecting electronics within the enclosure from being exposed to water from one of the probes.

12. The system as in claim 1 further comprising one or more dielectric spacers surrounding conductors for preventing electromagnetic arching from occurring between an enclosure and the conductors.

13. A method for treating harmful biological contaminants comprising:

treating harmful biological contaminants in water flowing through one or more plasma probes;

adaptively controlling backpressures exerted on elements of each of the plasma probes when a backpressure between the elements and a reservoir exceeds a threshold; and further treating the harmful biological contaminants in the water using an ionization section comprising one or more electrodes.

14. The method as in claim 13 further comprising determining whether the backpressure exceeds the threshold based on signals received from one or more sensors.

15. The method as in claim 14 further comprising decreasing or increasing an amount of water fed to the probes.

16. The method as in claim 13 further comprising isolating the probes from differences in flow rate of the water.

17. The method as in claim 16 further comprising detecting a water level of a buffer tank, and controlling a rate at which water should be supplied to, or restricted from flowing to, the buffer tank.

18. The method as in claim 13 wherein each electrode may comprise one or more of the following materials: arsenic, antimony, cadmium, chromium, copper, mercury, nickel, lead, silver, or zinc.

19. The method as in claim 13 further comprising controlling a polarity of each the electrodes to control leaching of ions from each of the electrodes.

20. The method as in claim 13 further comprising surrounding the probes with an electromagnetic interference shielded enclosure.

* * * * *